United States Patent [19]
Asakura et al.

[11] Patent Number: 5,777,410
[45] Date of Patent: Jul. 7, 1998

[54] MOTOR ACTUATOR AND METHOD OF MAKING THE SAME

[75] Inventors: Yasunori Asakura; Naohisa Shinmura, both of Kosai, Japan

[73] Assignee: ASMO Co., Ltd., Kosai, Japan

[21] Appl. No.: 760,301

[22] Filed: Dec. 4, 1996

[30] Foreign Application Priority Data

Dec. 4, 1995  [JP]  Japan .................................. 7-339961

[51] Int. Cl.[6] .................................................. H02K 11/00
[52] U.S. Cl. .................. 310/71; 310/70 R; 310/70 A; 310/69; 439/12
[58] Field of Search ........................... 310/71, 70 R, 310/70 A, 69; 439/8, 12, 13, 22, 72

[56] References Cited

U.S. PATENT DOCUMENTS

| | | | |
|---|---|---|---|
| 3,997,224 | 12/1976 | Ogawa et al. | 339/5 M |
| 4,398,135 | 8/1983 | Busch et al. | 318/443 |
| 4,850,880 | 7/1989 | Zayat, Jr. et al. | 439/11 |
| 4,850,881 | 7/1989 | Lagier et al. | 439/22 |
| 4,863,387 | 9/1989 | Snaper et al. | 439/31 |
| 4,876,909 | 10/1989 | Andrei-Alexandru et al. | 74/411.5 |
| 4,926,075 | 5/1990 | Fushiya et al. | 310/50 |
| 4,926,540 | 5/1990 | Kato | 29/596 |
| 4,930,370 | 6/1990 | Yoshida | 74/502.1 |
| 5,588,843 | 12/1996 | Sobhani | 439/22 |

FOREIGN PATENT DOCUMENTS

| | | |
|---|---|---|
| 3021948 C2 | 4/1990 | Germany . |
| 62-33691 | 2/1987 | Japan . |
| 62-172611 | 7/1987 | Japan . |
| 63-28715 | 2/1988 | Japan . |
| 63-136938 | 6/1988 | Japan . |
| 64-29790 | 2/1989 | Japan . |
| 1-127347 | 8/1989 | Japan . |
| 2-85612 | 7/1990 | Japan . |
| 3-167774 | 7/1991 | Japan . |
| 3-183338 | 8/1991 | Japan . |
| 5-252692 | 9/1993 | Japan . |
| 7-32179 | 7/1995 | Japan . |
| 8-70553 | 3/1996 | Japan . |

*Primary Examiner*—Steven L. Stephan
*Assistant Examiner*—Timothy A. Williams
*Attorney, Agent, or Firm*—Oblon, Spivak, McClelland, Maier & Neustadt, P.C.

[57] ABSTRACT

A first conductive plate is formed integrally of a single conductive sheet comprising a plurality of brushes and power supply terminals that are partially short-circuited, and a second conductive plate is formed integrally of a single conductive sheet comprising connector pins for connection for other components that are partially short-circuited.

12 Claims, 18 Drawing Sheets

FIG. 12

| STOP POSITION | SIGNAL LINES | | | |
|---|---|---|---|---|
| | 2 | 3 | 4 | 5 |
| ~POS.1 | 1 | 0 | 0 | 0 |
| POS.1 | 1 | 0 | 0 | 1 |
| POS.1 ~POS.2 | 0 | 0 | 0 | 1 |
| POS.2 | 0 | 0 | 1 | 1 |
| POS.2 ~POS.3 | 0 | 0 | 1 | 0 |
| POS.3 | 0 | 1 | 1 | 0 |
| POS.3 ~POS.4 | 0 | 1 | 0 | 0 |
| POS.4 | 1 | 1 | 0 | 0 |
| POS.4 ~POS.5 | 1 | 1 | 1 | 0 |
| POS.5 | 1 | 0 | 1 | 0 |
| POS.5~ | 1 | 0 | 1 | 1 |

5,777,410

MOTOR ACTUATOR AND METHOD OF MAKING THE SAME

BACKGROUND OF THE INVENTION

1. Field of the Invention

The invention relates to a motor actuator and a manufacturing method thereof. In particular, it relates to a motor actuator characterized in having an electrical wiring portion, and a manufacturing method thereof.

2. Description of Related Art

Japanese Utility Model Application Laid-Open No. 62-33691 discloses a prior-art example of a motor actuator. This motor actuator has a brush provided on an output gear which is in contact with a circuit pattern on a printed circuit board so as to complete a circuit for its rotation. A power supply plate for the motor and connector pins for connection to the outside are connected to the circuit pattern.

The power supply plate and connector pins are connected by soldering, so that these connections are time-consuming. Moreover, since the power supply plate and connector pins are manufactured as separate items, problems such as increased numbers of parts and higher costs have been inevitable. Attaching the brush to the output gear is also time-consuming.

An example of a prior-art position detector apparatus which is provided with a motor actuator is disclosed in Japanese Utility Model Publication No. 7-32179. In this apparatus, a brush that is provided on an output shaft and rotates together with the output shaft is in contact with an encoder pattern and the position of the brush is detected from the contact state thereof. The encoder pattern is formed on a printed circuit board facing this brush. It comprises a common contact piece that is always in contact with the brush and a plurality of simple contact pieces disposed around the periphery of the common contact piece, and position is detected from the contact state between the brush and the simple contact pieces. This apparatus has a problem in that each of the plurality of simple contact pieces is provided independently on the printed circuit board so that there is a large number of components. Furthermore, every time one of the independently provided simple contact pieces slides against the repeatedly rotating brush, it is highly likely that damage such as tearing of the edge of the simple contact piece will occur, so that the reliability with which the position is controlled is low. The job of connecting the brush to the output gear is also time-consuming.

SUMMARY OF THE INVENTION

The invention is devised to overcome the foregoing conventional problems, and has as its objective the provision of a motor actuator and a method of manufacturing the same, which can reduce the number of components, simplify the manufacturing process, and reduce costs.

In order to achieve this objective, a motor actuator in accordance with the invention comprises a gear rotated by a motor, a pattern conductor provided on one surface of the gear and rotating together with this gear, and a conducting unit.

The conducting unit comprises first and second conductive plates molded into an integral unit by an insulating resin.

The first conductive plate comprises a plurality of brushes sliding over the pattern conductor and a first pattern portion forming a predetermined wiring pattern comprising a plurality of first link portions.

The second conductive plate comprises a plurality of external connection terminals for connections with other components and a second pattern portion forming a predetermined wiring pattern comprising a plurality of second link portions.

The conducting unit comprises a pair of power supply terminals which are parts of the first and second conductive plates.

The wiring pattern of the first and second pattern portions is modified to suit the drive of the motor by cutting at least one part of the first and second link portions.

In this case, the gear rotated by the motor may be a reduction gear that is not an output gear having an output shaft. The pair of power supply terminals could be disposed in such a manner that both terminals are parts of either the first conductive plate or the second conductive plate, or they could be separated so that each power supply terminal is a part of each of the first and second conductive plates.

In this aspect of the invention, the plurality of brushes, the pair of power supply terminals, and the plurality of external connection terminals are formed integrally together with the first and second pattern portions as parts of the first conductive plate or the second conductive plate. Therefore there is no need to solder individual components, which simplifies the construction and makes it possible to reduce the number of components.

Since the brushes, the power supply terminals, and the external connection terminals are formed integrally as a single unit, a number of these units can be installed simultaneously when they are installed into the housing. Thus the installation work can be simplified. Since all of the terminals are previously supported within an insulating resin, the various members do not become separated, even when unwanted parts of the first and second link portions are cut.

The first conductive plate comprising the brushes and the second conductive plate comprising the external connection terminals are formed as separate components. Therefore, it is possible to ensure that each plate has the strength or resiliency required of it, with no need for subsequent work steps, by a suitable selection of the conductive sheet configuring each plate.

One of the first and second link portions may have nail portions. The nail portions are folded along the extension of the external connection terminals of the second conductive plate. The other of the first and second link portions may have supported portions. The supported portions are held by the folded nail portions.

In this aspect of the invention, the external connection terminals are held in place when the nail portions are folded because the nail portions are folded along the extension of the external terminals. The external connection terminals are positioned in the right place.

The position of the external connection terminals is further precise when the first and second link portions have respectively formed thereon apertures and projections which engage each other for positioning.

The second conductive plate is preferably formed to be thicker than the first conductive plate.

This configuration makes it possible to ensure that external terminals are strong enough to prevent deformation when they are matched with the corresponding connectors, by making the second conductive plate comprising the external connection terminals thicker than the first conductive plate comprising brushes which are required to have a certain resiliency.

The pattern conductor may comprise a conductive portion formed to be on a circular path that is concentric with the shaft of the gear, and first and second interruptive portions. The first interruptive portion is formed within part of the conductive portion, in a circular arc along a first circular path that is concentric with the shaft of the gear, so as to interrupt a circuit through the conductive portion. The second interruptive portion is formed within part of the conductive portion, in a circular arc along a second circular path that is concentric with the shaft of the gear and is located at a predetermined angular displacement from the first interruptive portion. The plurality of brushes may comprise a normally conductive terminal that always slides along the conductive portion, avoiding the first and second interruptive portions; a first intermittently conductive terminal that slides along the first circular path in which the first interruptive portion is formed; and a second intermittently conductive terminal that slides along the second circular path in which the second interruptive portion is formed In this aspect of the invention, when each of the first and second intermittently conductive terminals is in contact with the conductive portion, it completes a circuit through the normally conductive terminal which is always in contact with this conductive portion, making it possible to rotate the motor.

When the first intermittently conductive terminal is in contact with the first interruptive portion or the second intermittently conductive terminal is in contact with the second interruptive portion, the circuit formed between the first or second intermittently conductive terminal and the normally conductive terminal is broken, stopping the motor. This makes it possible to control the rotation in accordance with the shape of the conductive and interruptive portions.

The pattern conductor of the invention may comprise a resistive portion, which has a predetermined resistance and is formed on a circular arc that is concentric with the shaft of the gear, and a conductive portion, which is formed on a circular path that is concentric with the shaft of the gear and is electrically connected to one edge of the circular arc of the resistive portion in the longitudinal direction thereof. The plurality of brushes may comprise a conductive conductor terminal that makes contact with the conductive portion and a resistive conductor terminal that makes contact with the resistive portion.

With this aspect of the invention, the conductive conductor terminal is connected in contact with the conductive portion which is connected in contact with one edge portion of the resistive portion. The resistive conductor terminal comes into electrical contact with a predetermined point in the longitudinal direction of the resistive portion. In this case, since the conductive portion is connected to an edge portion of the circular arc of the resistive portion, the length of the resistive portion between the conductive portion and the contact point of the resistive conductor terminal as it slides along the resistive portion varies with the position of this contact point, and thus the resistance thereof varies. As the gear rotates, a voltage drop is generated due to the resistance that changes as the resistive conductor terminal slides over the resistive portion. This resistance can be changed in such a manner that the change in the resistance is in accordance with the rotational position of the gear, and thus the rotation of the motor can be controlled.

The pattern conductor may comprise a common conductive portion formed along a circular path that is concentric with the shaft of the gear and a plurality of individual conductive portions disposed in a plurality of arrays concentrically and at a certain spacing around the periphery of the common conductive portion.

The common conductive portion and the plurality of individual conductive portions may be formed as an integral assembly connected together by at least portions thereof on the inner or outer sides.

The plurality of brushes may comprise a common brush, which slides along the circular path formed by the common conductive portion and which is always in contact with the common conductive portion, and individual brushes, each of which slides along one of the circular paths formed by the plurality of individual conductive portions, in contact with the corresponding individual conductive portion.

With this aspect of the invention, the common conductive portion is always in contact with the common brush. A signal line is governed by combinations of the contact states between the individual conductive portions and the individual brushes, whereby position can be detected. The signal line can changed easily by modifying the forms of the common conductive portion and the individual conductive portions, and by modifying the locations at which the first and second link portions are cut. Since the common conductive portion and individual conductive portions are formed integrally, the configuration is simpler and stronger than a configuration in which the individual conductive portions are independent components. There is also less likelihood of damage caused by the repetitive sliding motion of the individual brushes, so positional control is highly reliable.

The output shaft that transfers the driving force of the motor out of the apparatus is preferably connected to a damper within an air-conditioner of a vehicle and is attached thereto in such a manner that it switches the orientation of this damper. This damper is at least one of a damper for switching between the interior and exterior of the vehicle, a damper for switching outlet ports, and a damper for adjusting the proportion of cold and hot air.

This configuration makes it possible to use the motor actuator of the invention as a motor actuator that controls a damper of a vehicle's air-conditioner, so that it can control the damper of this air-conditioner.

A method of making a motor actuator comprises:
  making said first conductive plate from a single conductive sheet, said first conductive plate having said plurality of brushes and said first pattern portion as one body, said first pattern portion forming a first temporary wiring pattern, said first pattern portion comprising said plurality of first link portions and other first temporary link portions;
  making said second conductive plate from another single conductive sheet, said second conductive plate having said plurality of external connection terminals for electrical connection to other components and said second pattern portion as one body, said second pattern portion forming a second temporary wiring pattern, said second pattern portion comprising said plurality of second link portions and other first temporary link portions;
  linking said first conductive plate to said second conductive plate;
  forming said conducting unit by embedding said linked first and second conductive plates together in said insulating resin;
  subsequently cutting said first and second temporary link portions of said first and second conductive plates to make said first and second predetermined wiring pattern, said first and second predetermined wiring pattern suiting a drive of said motor; and installing said conducting unit in a housing after said cutting step is completed.

With this aspect of the invention, brushes and a first pattern portion are fabricated simultaneously from a single conductive sheet and external connection terminals and a second pattern portion are fabricated simultaneously from another single conductive sheet, simplifying the manufacturing process and also improving the yield. Since the first conductive plate comprising brushes that should be made thin to ensure they have a predetermined resiliency is formed separately from the second conductive plate comprising external connection terminals that should be made thicker to ensure they have a predetermined strength, each plate can be formed in a simple manner to have the thickness required of it by suitable selection of conductive sheets for the fabrication, without the need for any extra steps after the motor actuator is fabricated. A wiring pattern suitable for a specific motor can be formed after the first and second conductive plates have been linked together and supported, making it possible to form wiring patterns for various different circuits by simply changing the locations at which the link portions are cut.

For example, when the second conductive plate has been fabricated for a situation in which six external connection terminals are connected, if all of the link portions are cut, each external connection terminal can be independently connected to another component. If only some of the link portions are cut so that the terminals are shorted in pairs, this terminals are similar to three external connection terminals.

Since the conducting unit is installed in the housing after the brushes and external connection terminals have been fixed together integrally, the installation work is simple.

One of the first and second link portions may have nail portions. The nail portions are folded along the extension of the external connection terminals of the second conductive plate. The other of the first and second link portions may have supported portions. The supported portions are held by the folded nail portions. In this aspect, the invention may comprise the process of linking the first conductive plate to the second conductive plate by holding the supported portions with the nail portions folded along the extension of the external terminals. The external connection terminals are positioned in the right place.

The first and second link portions may have respectively formed thereon apertures and projections which engage each other for positioning. In this aspect, the invention may comprise the process of linking the first conductive plate to the second conductive plate after positioning with the apertures and the projections engaged. The position of the external connection terminals is further precise.

BRIEF DESCRIPTION OF THE DRAWINGS

The invention is described in detail with reference to the following drawings, wherein:

FIG. 12 shows a diagram stored in ROM;

DETAILED DESCRIPTION OF THE PREFERRED EMBODIMENTS

Preferred embodiments of the invention will now be described with reference to the drawings.

Figure 1:
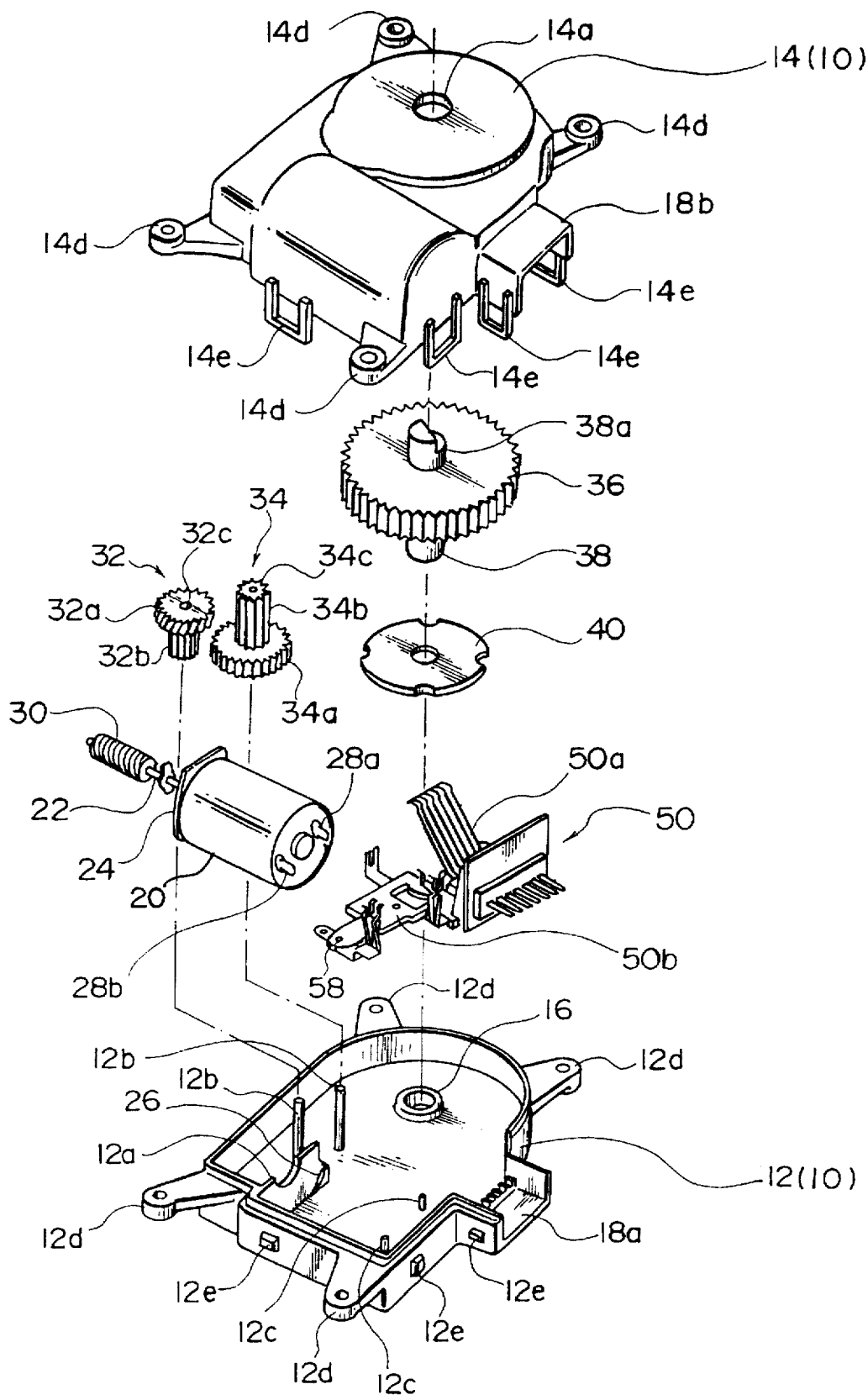
FIG. 1 is an exploded perspective view of a motor actuator that is an embodiment of the invention.

An exploded perspective view of a motor actuator of a first embodiment is shown in FIG. 1. This motor actuator controls the air-conditioning of a vehicle and comprises a motor 20, a worm gear 30, reduction gears 32 and 34, an output gear 36, a pattern board 40, and a conducting unit 50, all accommodated within a housing 10.

The housing 10 is formed of a synthetic resin such as a reinforced plastic, and comprises a casing 12 in which the above elements are mounted and a cover 14 which fits over the casing 12.

On the casing 12 are formed a motor mounting portion 12a for positioning and mounting the motor 20, support shafts 12b for rotatably supporting the reduction gears 32 and 34, mounting projections 12c for positioning and fixing by heat-caulking the conducting unit 50, a plurality of mounting lugs 12d for screw-fixing to the vehicle, projections 12e for clipping on the cover 14, a boss 16 for supporting one end of a shaft 38 of the output gear 36, and a connecting portion 18a. The connecting portion 18a together with another connecting portion 18b provided on the cover 14 forms a socket into which a plug is inserted for electrical connection to the outside.

The cover 14 also has formed thereon mounting lugs 14d which align with the mounting lugs 12d for mounting on the vehicle, clips 14e which engage with the projections 12e, and an output aperture 14a through which the other end of the shaft 38 projects to the outside.

The motor 20 is electrically connected by two terminals 28a and 28b. A mounting plate 24 provided at an output shaft 22 side is configured so that it can be slotted into a fixing slot 26 formed by the motor mounting portion 12a, thus enabling the positioning and mounting of the motor 20. The worm 30 is provided on the output shaft 22 of the motor 20.

Rotation of the worm 30 is transmitted through the reduction gears 32 and 34 to the output gear 36. In more detail, the reduction gears 32 comprise an integrally formed large-diameter gear 32a and small-diameter gear 32b, and the reduction gears 34 comprise an integrally formed large-diameter gear 34a and small-diameter gear 34b. Rotation of the worm 30 is transmitted to the large-diameter gear 32a of the reduction gears 32, is then output from the small-diameter gear 32b and transmitted to the large-diameter gear 34a of the reduction gears 34, and is then output from the small-diameter gear 34b to the output gear 36. The reduction gears 32 and 34 have holes 32c and 34c formed therethrough along the axes of rotation thereof, and they are mounted on the casing 12 of the housing 10 by passing the support shafts 12b through these holes 32c and 34c. Thus the rotation of the motor 20 is transmitted to the output gear 36.

The output gear 36 is formed integrally with the shaft 38 so that the rotation of the small-diameter gear 34b is therefore transmitted to the shaft 38. In order to attach a crank (not shown in the drawing) to the end of the shaft 38, a cutout portion 38a is formed therein to provide a meshing attachment.

The pattern board 40 is fixed to one surface of the output gear 36, and the pattern thereon will be described later.

The conducting unit 50 comprises a conductive plate 50a and a support portion 50b formed of an insulating resin, and fixing holes 58 are formed integrally in the conductive plate 50a and the support portion 50b so that the mounting projections 12c may be passed therethrough and fixed by heatcaulking. Alternatively, the fixing holes 58 may be formed so that the mounting projections 12c may be press-fitted therein. It is equally possible to form engaging portions (not shown in the drawing) on the casing 12 and corresponding portions (not shown in the drawing) on the conducting unit 50, and achieve the fixing by the engagement thereof. These engaging portions and corresponding portions may be constructed in any conventional manner.

The fixing holes 58 and mounting projections 12c are designed in such a way that the conducting unit 50 is disposed in an appropriate position. Specifically, brushes 61 to 66 of the conducting unit 50 should be positioned so that their contact points with the pattern board 40 are aligned on a straight line passing through the axis of rotation of the output gear 36. To this end, the fixing holes 58 and mounting projections 12c are positioned accurately so that the conducting unit 50 can be positioned accurately by simply mounting the fixing holes 58 onto the mounting projections 12c.

Figure 2A:
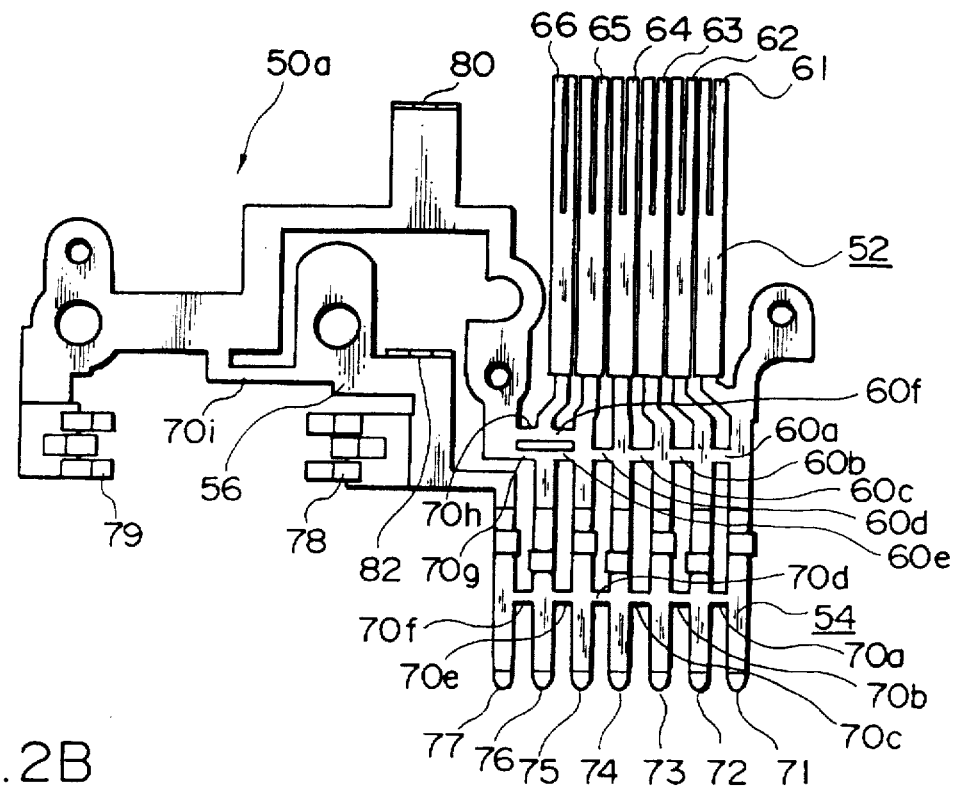
FIG. 2A is an enlarged plan view of the conductive plate before cutting link portions and adjusting an angle of each brush.
Figure 2B:
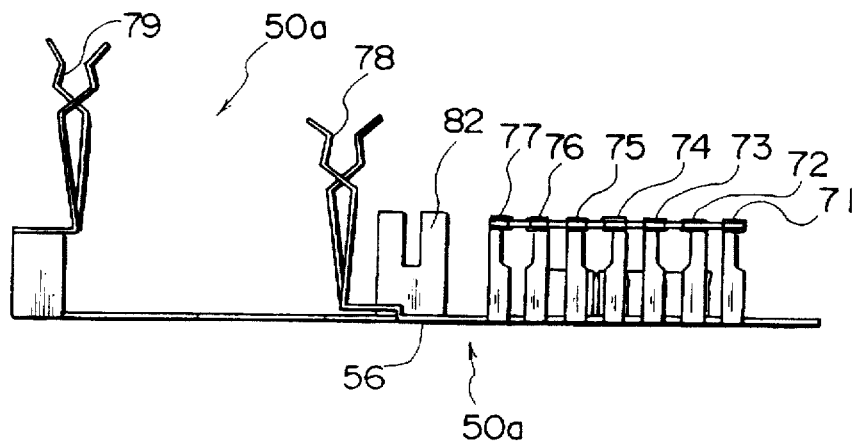
FIG. 2B is a front view thereof.
Figure 2C:
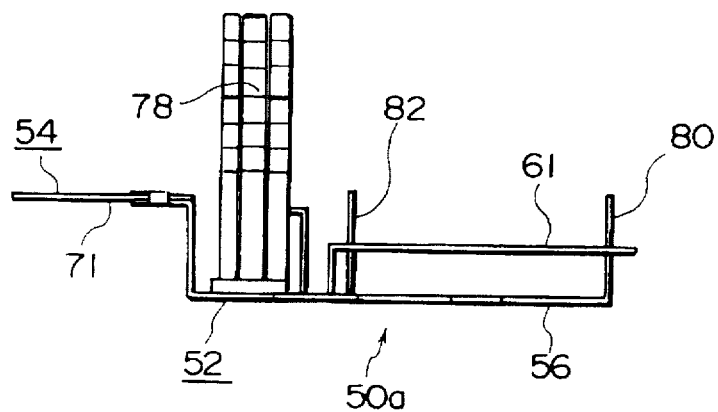
FIG. 2C is a side view thereof.

A plan view of the conductive plate 50a in the middle of making process is shown in FIG. 2A, a front view thereof is shown in FIG. 2B, and a side view thereof is shown in FIG. 2C. The conductive plate 50a shown in FIG. 1 can be obtained from the conductive plate 50a shown in FIGS. 2A to 2C by cutting some of link portions 60a to 60f and 70a to 70i thereof and by adjusting an angle of each of brushes 61 to 66 thereof. Then the conducting unit 50 is mounted in the casing 12.

The conductive plate 50a comprises the brushes 61 to 66 in contact with the pattern board 40, a pair of power supply terminals 78 and 79 connected to the terminals 28a and 28b of the motor 20, a pair of connection terminals 80 and 82 for connection to a component such as a resistor or a capacitor, connector pins 71 to 77 for connection to the outside, and a pattern portion 56 connecting all of these terminals together. The brushes 61 to 66, power supply terminals 78 and 79, connection terminals 80 and 82, and connector pins 71 to 77 are formed to stand upright from the flat pattern portion 56.

Figure 3:
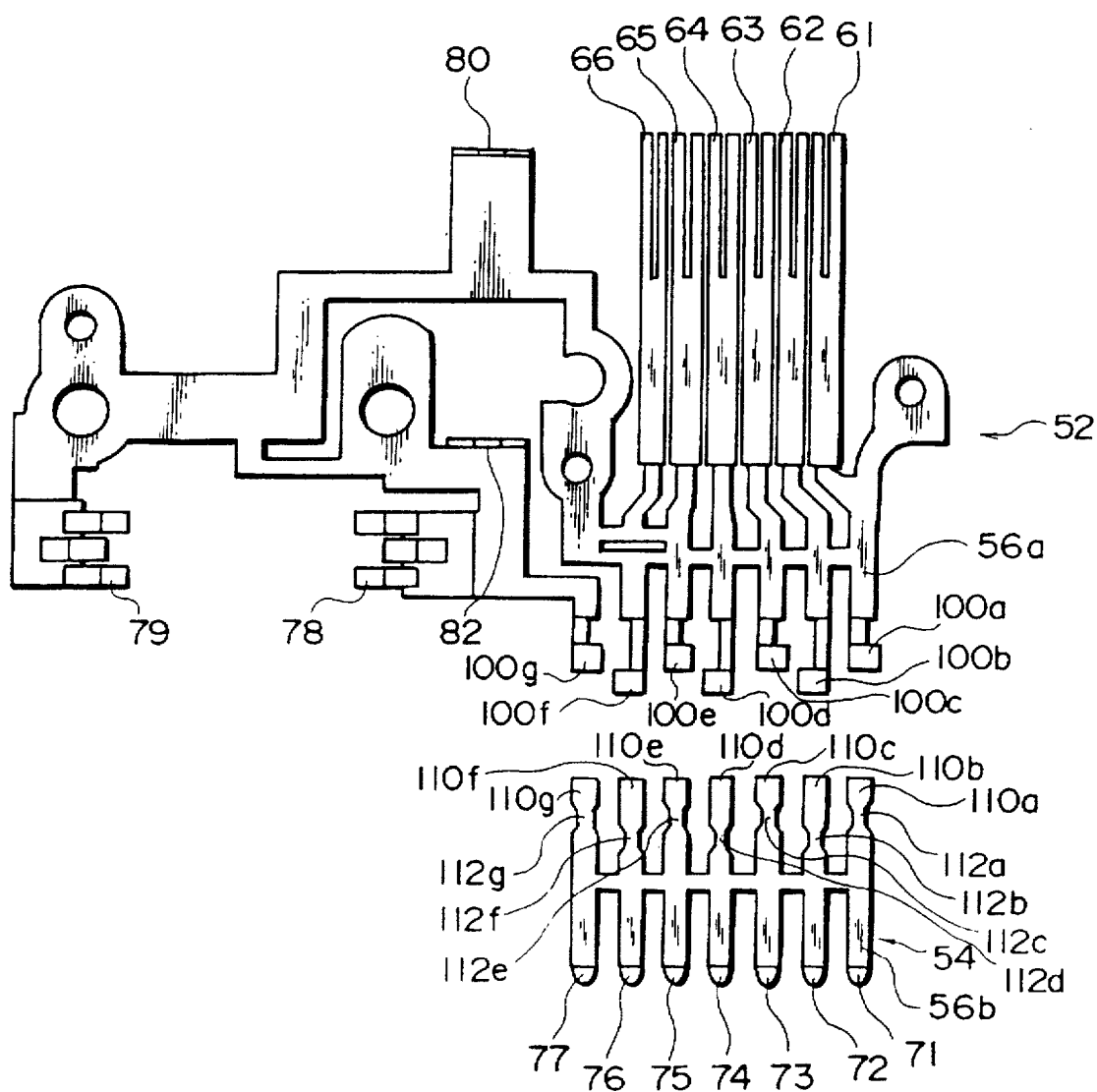
FIG. 3 is a plan view of the first and second conductive plates that configure the conductive plates of FIG. 1.
Figure 4:
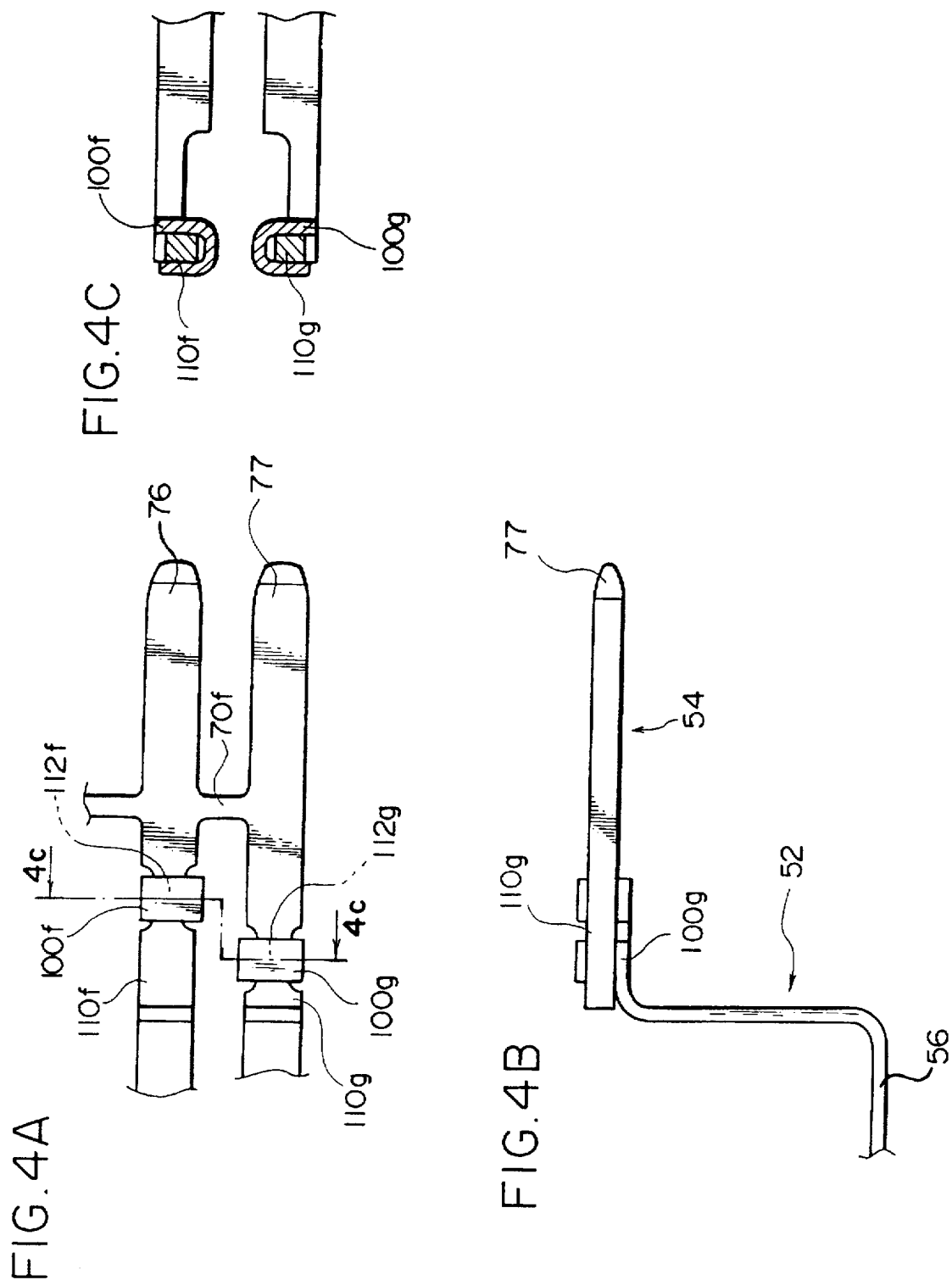
FIG. 4A is a plan view of an attachment portion between the first and second conductive plates of FIG. 1.
FIG. 4B is a side view thereof.
FIG. 4C is a cross-sectional view taken along the line C—C of FIG. 4A.

The conductive plate 50a is formed of a first conductive plate 52 and a second conductive plate 54 that are separate components connected together, as shown in FIG. 3. The first conductive plate 52 and the second conductive plate 54 are shown in plan view in FIG. 3. A plan view of a link portion between the first conductive plate 52 and the second conductive plate 54 is shown in FIG. 4A, a side view thereof is shown in FIG. 4B, and a section taken along the line C—C of FIG. 4A is shown in FIG. 4C.

The first conductive plate 52 is manufactured from a conductive sheet, such as a metal sheet, formed in a predetermined shape by punching. More specifically, the brushes 61 to 66, the power supply terminals 78 and 79, the connection terminals 80 and 82, and a pattern portion 56a that connects together these components are formed integrally from a single conductive sheet, with parts of the pattern portion 56a being short-circuited. Certain parts of this sheet, such as the brushes 61 to 66, are configured to be bent. Link portions 100a to 100g are formed on an edge portion of the first conductive plate 52 on its side to be connected to the second conductive plate 54. Note that the first conductive plate 52 in this embodiment is a brass plate plated with tin.

The second conductive plate 54 is also manufactured from a conductive sheet, such as a metal sheet, formed in a predetermined shape by punching. More specifically, the connector pins 71 to 77 and a pattern portion 56b that connects together these connector pins 71 to 77 are formed integrally from a single conductive sheet, with parts of the pattern portion 56b being short-circuited. It is thicker than the first conductive plate 52 (see FIG. 4B). Link portions 110a to 110g are formed on an edge portion of the second conductive plate 54 on its side to be connected to the first conductive plate 52. Note that the second conductive plate 54 in this embodiment is a phosphor bronze plate.

The link portions of the first conductive plate 52 and the second conductive plate 54 are related as follows: the link portions 100a and 110a are aligned, the link portions 100b and 110b are aligned, and so on up to the link portions 100g and 110g. Once these link portions have been staked together, the plates can be fixed together by spot-welding.

As previously mentioned, the link portions 100a to 100g are formed protruding from a part of the pattern portion 56a of the first conductive plate 52. Similarly, the link portions 110a to 110g are formed along an edge portion of the pattern portion 56b of the second conductive plate 54, but with narrow portions 112a to 112g therein, as shown in FIGS. 4A.

To take the link portion 100f as an example, this link portion 100f is staked in a state in which it is holding the narrow portion 112f of the link portion 110f (see FIGS. 4A to 4C).

In this manner, each of the first conductive plate 52 and the second conductive plate 54 is formed by punching from a single conductive sheet, and these are fixed together to manufacture the conductive plate 50a. This makes it possible to omit the steps of forming the various components such as the brushes, power supply terminals, and connectors individually then connecting them together by means such as soldering. Furthermore, since the brushes 61 to 66 are manufactured simultaneously, yield is increased with no waste of material. The manufacturing process is also simplified by bending the material at the same time as it is punched.

By configuring the conductive plate 50a of the first conductive plate 52 and the second conductive plate 54, which are separate members, it is possible to ensure that each of the terminals thereof have necessary thicknesses. In other words, the brushes 61 to 66 must be made thinner to enable them to have the resiliency that brushes require, whereas the connector pins 71 to 77 must be made thicker to prevent deformation when they are engaged with the opposing connectors. In this embodiment of the invention, the second conductive plate 54 that forms the connector pins 71 to 77 can be made thicker than the first conductive plate 52 that forms the brushes 61 to 66 by manufacturing each of the first conductive plate 52 and the second conductive plate 54 from a conductive plate of the required thickness. Thus the required thicknesses can be guaranteed in a simple manner by selecting suitable conductive plates, without necessitating any further step of forming ribs or the like.

The conductive plate 50a is formed in such a manner that parts of the pattern portion 56 are short-circuited, as shown in FIGS. 2A to 2C, so that the brushes 61 to 66, the connector pins 71 to 77, and the power supply terminals 78 and 79 are all connected together electrically.

In other words, the various parts of the pattern portion 56 are connected together electrically by a plurality of link portions 60a to 60f and 70a to 70i that act as short-circuiting portions, and these link portions 60a to 60f and 70a to 70i can be cut as necessary (details will be given later).

This conductive plate 50a is supported by a support portion 50b, as shown in FIG. 1. More specifically, this support portion 50b is formed in such a manner that the brushes 61 to 66 and connector pins 71 to 77 do not become separated from the assembly, even if all of the link portions 60a to 60f and 70a to 70i are cut. Therefore, the support portion 50b can be of any form, so long as the brushes 61 to 66 and the connector pins 71 to 77 can never become separated. However, it is preferable that the support portion 50b is configured in such a manner that it avoids the link portions 60a to 60f and 70a to 70i, so that these link portions 60a to 60f and 70a to 70i can be cut as required.

In other words, any of the brushes 61 to 66 and any of the connector pins 71 to 77 and power supply terminals 78 and 79 can be connected electrically by cutting the link portions 60a to 60f and 70a to 70i of a common pattern portion 56 as required to suit a variety of motors, thereby configuring a pattern portion for each individual motor.

The link portions 60a to 60f and 70a to 70i may be cut either before or after the conducting unit 50 has been mounted in the housing 10. If the link portions 60a to 60f and 70a to 70i are to be cut after the conducting unit 50 is mounted in the housing 10, a laser can be used therefor. In such a case, it is preferable that through-holes (not shown in the drawing) are formed in the casing 12, so that the laser beam can pass therethrough without damaging the housing 10.

Figure 5:
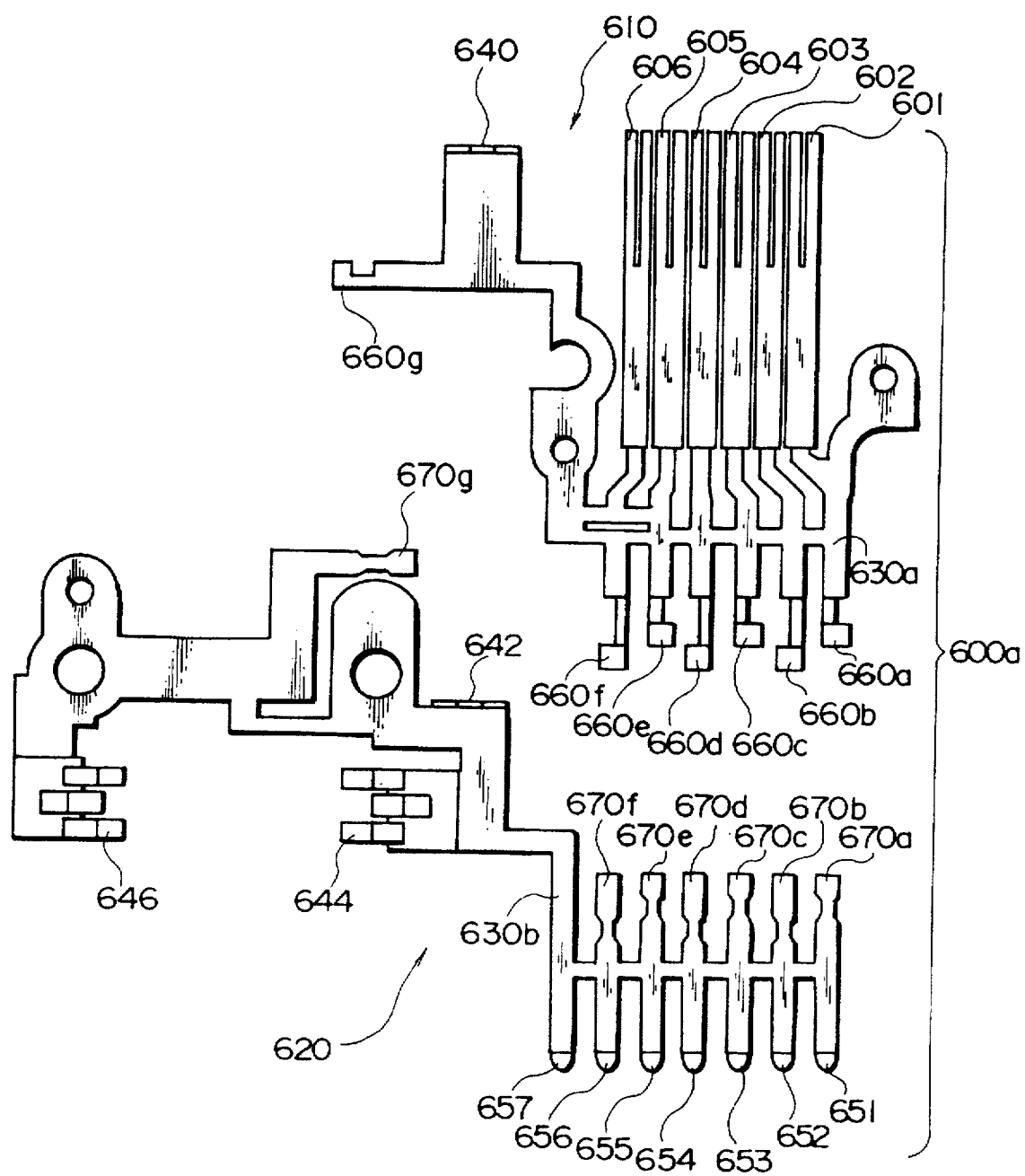
FIG. 5 is a plan view of a variation of the first and second conductive plates that configure the conductive plates of FIG. 1.

A plan view of a first conductive plate 610 and a second conductive plate 620, which together configure a conductive plate 600a that is a variation of the conductive plate 50a of a motor actuator in accordance with this embodiment, is shown in FIG. 5. In a similar manner to the conductive plate 50a of the previously described motor actuator, this conductive plate 600a is formed of the first conductive plate 610 and the second conductive plate 620 that are separate components connected together.

The first conductive plate 610 is formed in such a manner that brushes 601 to 606, a connection terminal 640, and a pattern portion 630a that fixes together this group of terminals are formed integrally of a single conductive plate, with portions thereof short-circuited.

The second conductive plate 620 is formed in such a manner that connector pins 651 to 657, power supply terminals 644 and 646, a connection terminal 642, and a pattern portion 630b that fixes together this group of terminals are formed integrally of a single conductive plate, with portions thereof short-circuited.

In other words, the conductive plate 600a of this variation differs from the conductive plate 50a of the previously described embodiment in that the power supply terminals 644 and 646 for connection to the motor are provided on the second conductive plate 620 which comprises the connector pins 651 to 657. It also differs in that one of the pair of connection terminals 640 and 642 for connection to a component such as a capacitor is provided on the first conductive plate 610 and the other is provided on the second conductive plate 620.

The first conductive plate 610 and second conductive plate 620 are each manufactured from a conductive sheet, such as a metal sheet, formed in a predetermined shape by punching and then bending it at required locations. The second conductive plate 620 is formed to be thicker than the first conductive plate 610. The first conductive plate 610 could be a brass plate plated with tin and the second conductive plate 620 could be of phosphor bronze.

Once link portions 660a to 660g of the first conductive plate 610 and link portions 670a to 670g of the second conductive plate 620 have been staked together, they are spotwelded to form the conductive plate 600a. The forms of the link portions and the linkage method thereof are similar to those of the conductive plate 50a of the previously described embodiment, so further description thereof is omitted.

After the conductive plate 600a has been supported by holder portions, short-circuiting portions that are not required for the electrical connections are cut. This makes it possible to manufacture a pattern portion to suit an individual motor, in the same manner as with the conductive plate 50a of the above embodiment.

Thus a suitable selection of conductive plates of predetermined thicknesses makes it possible to ensure that a first conductive plate 610 has brushes 601 to 606 of a thinness necessary for resiliency, whereas a second conductive plate 620 has connector pins 651 to 657 of a predetermined thickness necessary to prevent deformation when they are matched with the corresponding connectors.

In other words, the above described effects can be achieved by forming the brushes 601 to 606 (or 61 to 66 of the previously described embodiment) and connector pins 651 to 657 (or 71 to 77) as parts of the first conductive plate 610 (or 52) and the second conductive plate 620 (54), respectively. The power supply terminals 644 and 646 (or 78 and 79) and the connection terminals 640 and 642 (or 80 and 82) could be provided on either the first conductive plate or the second conductive plate as necessary, or the power and connection terminals could be separated so that one of each is provided on the first conductive plate and the second conductive plate.

Figure 6:
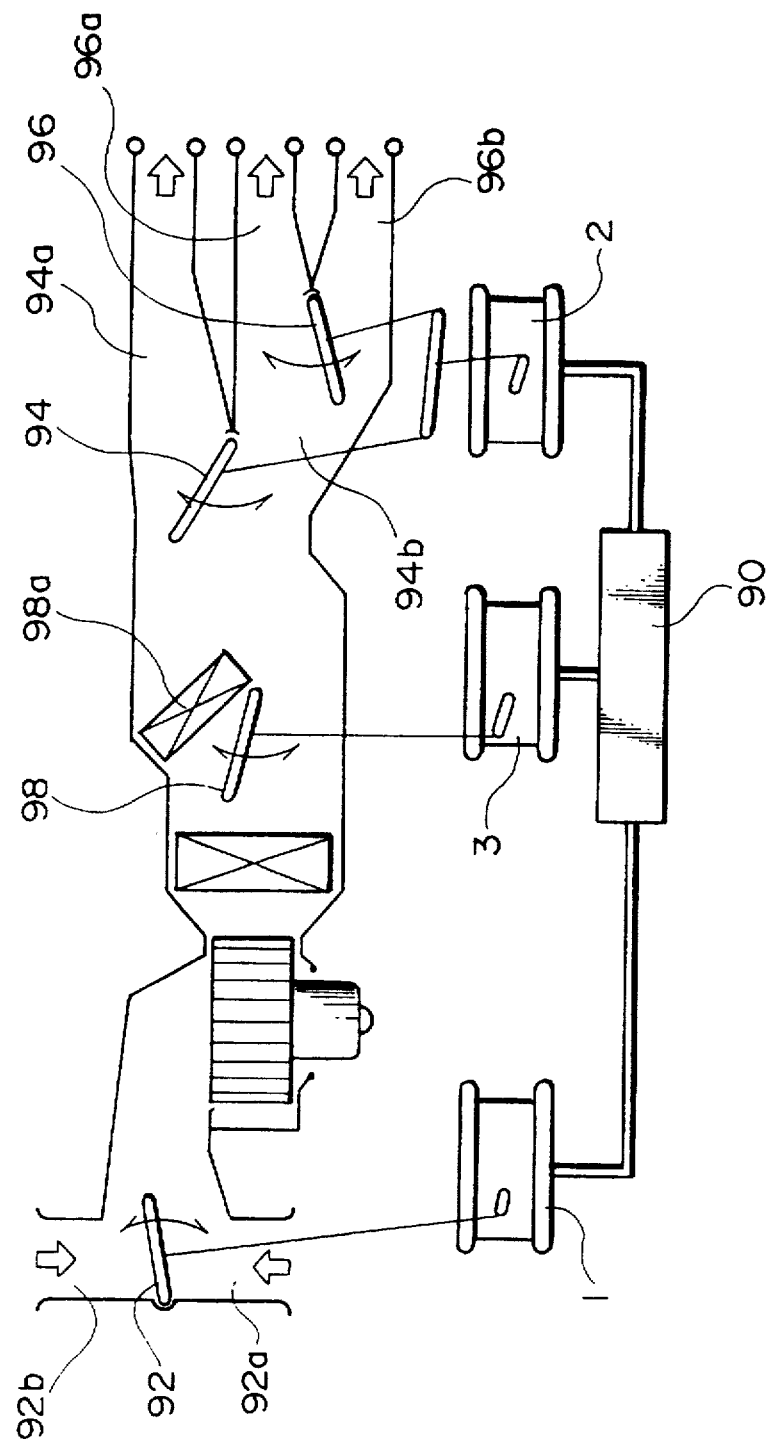
FIG. 6 is a schematic view illustrating control of a vehicle air-conditioner by the motor actuator of the invention.

A schematic diagram of a motor actuator used to control a vehicle air-conditioning system is shown in FIG. 6. In this drawing, motor actuators 1, 2, and 3 are operated in accordance with instructions from a controller 90. The motor actuator 1 drives a damper 92 for switching between an internal air intake duct 92a and an external air intake duct 92b. The motor actuator 2 drives dampers 94 and 96 for switching outlet ports. More specifically, the damper 94 switches between a duct 94a leading to a defroster and a duct 94b leading to a outlet port disposed inside the vehicle. This duct 94b is switched by the damper 96 between a duct 96a leading to a outlet port near the dashboard and a duct 96b leading to a outlet port near foot level within the vehicle. The motor actuator 3 drives a damper 98 for adjusting the proportion of cold air to hot air, which opens and closes a heater core 98a. For the motor actuators 1, 2, and 3 to operate each of the dampers 92 to 98, it is necessary to convert their rotary motion to oscillatory motion. Since this may be achieved by a conventional mechanism and does not relate directly to the invention, a detailed explanation thereof is omitted.

Figure 7A:
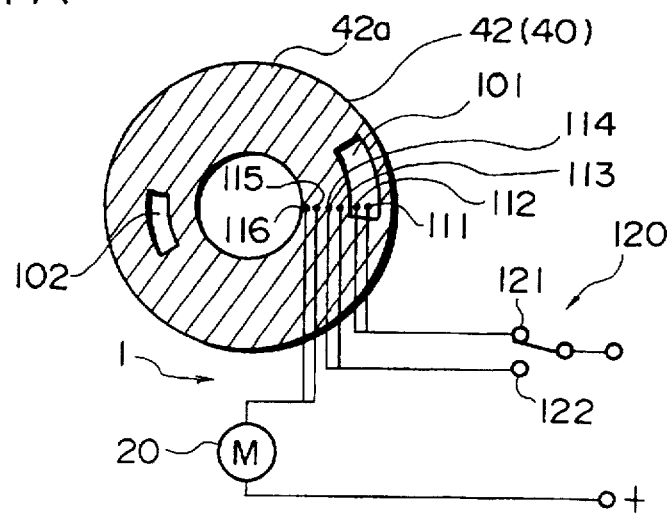
FIGS. 7A to 7C show circuits for driving the motor actuators of FIG. 6.
Figure 7B:
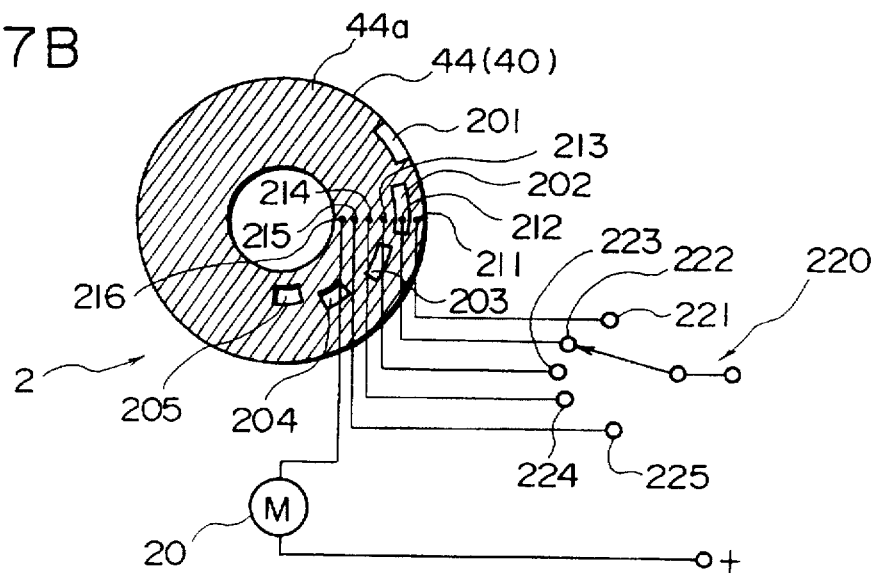
Figure 7C:
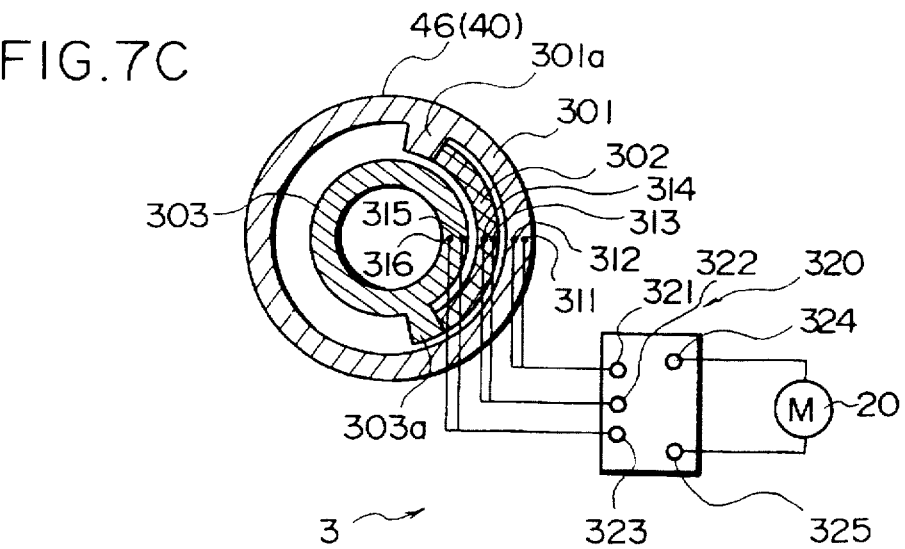

Circuits for driving the motor actuators 1, 2, and 3 are shown in FIGS. 7A to 7C. Of these drawings, FIG. 7A shows a circuit for driving the motor actuator 1, FIG. 7B shows a circuit for driving the motor actuator 2, and FIG. 7C shows a circuit for driving the motor actuator 3. In FIGS. 7A to 7C, the pattern boards 42, 44, and 46 illustrate specific patterns of the pattern board 40 of FIG. 1.

The following description relates to the motor actuator 1.

In FIG. 7A, the pattern of the pattern board 42 comprises a circular conductive portion 42a having two insulating portions 101 and 102 which are located on different concentric circular paths and are spaced apart by 180 degrees. The brushes 61 to 66 (see FIGS. 2A to 2C) slide over and contact the conductive portion 42a at contact positions shown in FIG. 7A as contact points 111 to 116. The brushes and contact points are related as follows: the brush 61 to the contact point 111, the brush 62 to the contact point 112, and so on up to the brush 66 to the contact point 116.

The contact points 111 and 112 slide along a first path that includes the insulating portion 101, the contact points 113 and 114 slide along a second path that includes the insulating portion 102, and the contact points 115 and 116 always slide along a region of the conductive portion 42a where there are no insulating portions. The contact points 111 and 112 are connected to a contact point 121 of a switch 120, the contact points 113 and 114 are connected to a contact point 122 of the switch 120, and the switch 120 selectively connects one of these switch contact points 121 and 122 to ground. The contact points 115 and 116 are connected to one terminal 28b of the motor 20 (see FIG. 1), and the other terminal 28a thereof is connected to the power supply.

Figure 8:
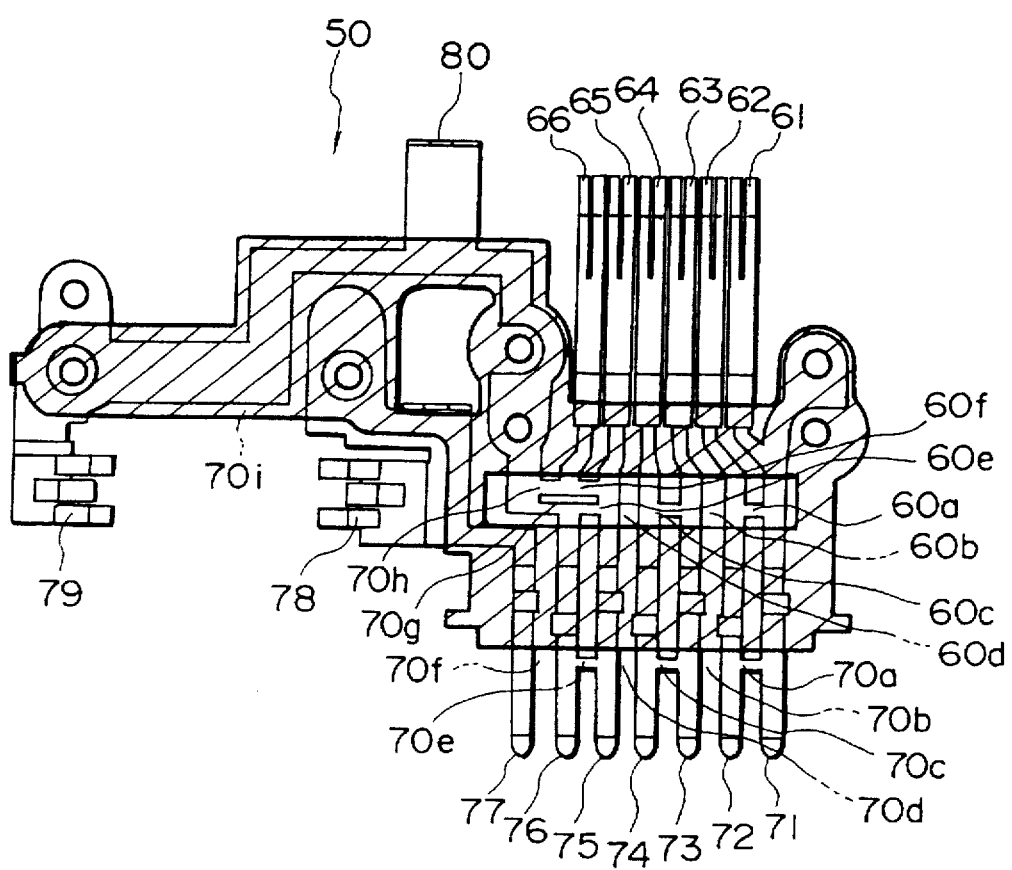
FIG. 8 shows a conducting unit that forms part of the circuit of FIG. 7A, after link portions have been cut at certain locations.

More specifically, a circuit is formed by cutting certain parts of the link portions 60a to 60f and 70a to 70i of the conducting unit 50. FIG. 8 shows the conducting unit 50 that forms part of the circuit shown in FIG. 7A, after the link portions have been cut at certain locations.

In FIG. 8, the link portions 60b, 60d, 70b, 70d, 70f, and 70i have been cut. The resultant conducting state is as described below.

Firstly, the brushes 61 and 62 (contact points 111 and 112) are connected together by the link portions 60a and 70a, and are also connected by the connector pins 71 and 72 to the switch contact point 121, which is not shown in this drawing (see FIG. 7A).

The brushes 63 and 64 (contact points 113 and 114) are connected together by the link portions 60c and 70c, and are also connected by the connector pins 73 and 74 to the switch contact point 122, which is not shown in this drawing (see FIG. 7A). Note that the brushes 62 and 63 are electrically disconnected from each other by cutting the link portions 60b and 70b.

Similarly, the brushes 65 and 66 (contact points 115 and 116) are connected together by the link portions 60e and 70e, and are connected by the power supply terminal 79 to the terminal 28b of the motor 20, which is not shown in this drawing (see FIG. 1). Note that the brushes 64 and 65 are electrically disconnected from each other by cutting the link portions 60d and 70d.

The other terminal 28a of the motor 20 (see FIG. 1) is connected to the power supply (not shown in the drawing) by the power supply terminal 78 and the connector pin 77. Note that the connector pins 76 and 77 are electrically disconnected from each other by cutting the link portions 70f and 70i.

The operation of the motor actuator 1 is now described, based on FIG. 7A. In the state shown in this drawing, the switch contact point 121 is grounded by the switch 120, but since the contact points 111 and 112 are on the insulating portion 101 and the contact points 111 and 112 are electrically isolated from the contact points 115 and 116, no current flows therebetween and the motor 20 does not rotate. If the switch 120 is now switched so as to ground the switch contact point 122, the conductive portion 42a completes a circuit between the contact points 111 and 112 and the contact points 115 and 116, so that the motor 20 rotates. When the contact points 112 and 113 reach the insulating portion 102, the circuit is broken by the insulating portion 102 and the motor 20 stops rotating.

In this way, switching the switch 120 makes it possible to stop the motor 20 at either of two positions: with the contact points 111 and 112 on the insulating portion 101 or with the contact points 113 and 114 on the insulating portion 102.

The pattern board 42 embodies a specific pattern of the pattern board 40 of FIG. 1. It is attached to one surface of the output gear 36 which rotates about the shaft 38. As a result, since the pattern board 42 rotates with the rotation of the shaft 38, the two positions at which the motor 20 stops correspond to rotary positions of the shaft 38. In other words, the operation of the switch 120 makes it possible to stop the shaft 38 at either of two positions.

In this way, it is possible to dispose the damper 92 in a position in which either the duct 92a or the duct 92b is closed, by stopping the motor actuator 1 shown in FIG. 6 selectively at either of two positions.

The following description relates to the motor actuator 2.

In FIG. 7B, the pattern of the pattern board 44 comprises a circular conductive portion 44a having insulating portions 201 to 205 which are located on different concentric circular paths and are spaced apart by certain angles. The brushes 61 to 66 (see FIGS. 2A and 2B) slide over and contact the conductive portion 44a at contact positions shown in FIG. 7B as contact points 211 to 216. The brushes and contact points are related as follows: the brush 61 to the contact point 211, the brush 62 to the contact point 212, and so on up to the brush 66 to the contact point 216.

The contact points 211 to 215 slide along separate paths that include the insulating portions 201 to 205, respectively, and the contact point 216 always slides along a region of the conductive portion 42a where there are no insulating portions.

The contact points 211 to 215 are connected to switch contact points 221 to 225, respectively, of a switch 220. This switch 220 selectively connects one of the contact points 221 to 225 to ground. The contact point 216 is connected the terminal 28b of the motor 20 (see FIG. 1), and the other terminal 28a thereof is connected to the power supply.

Figure 9:
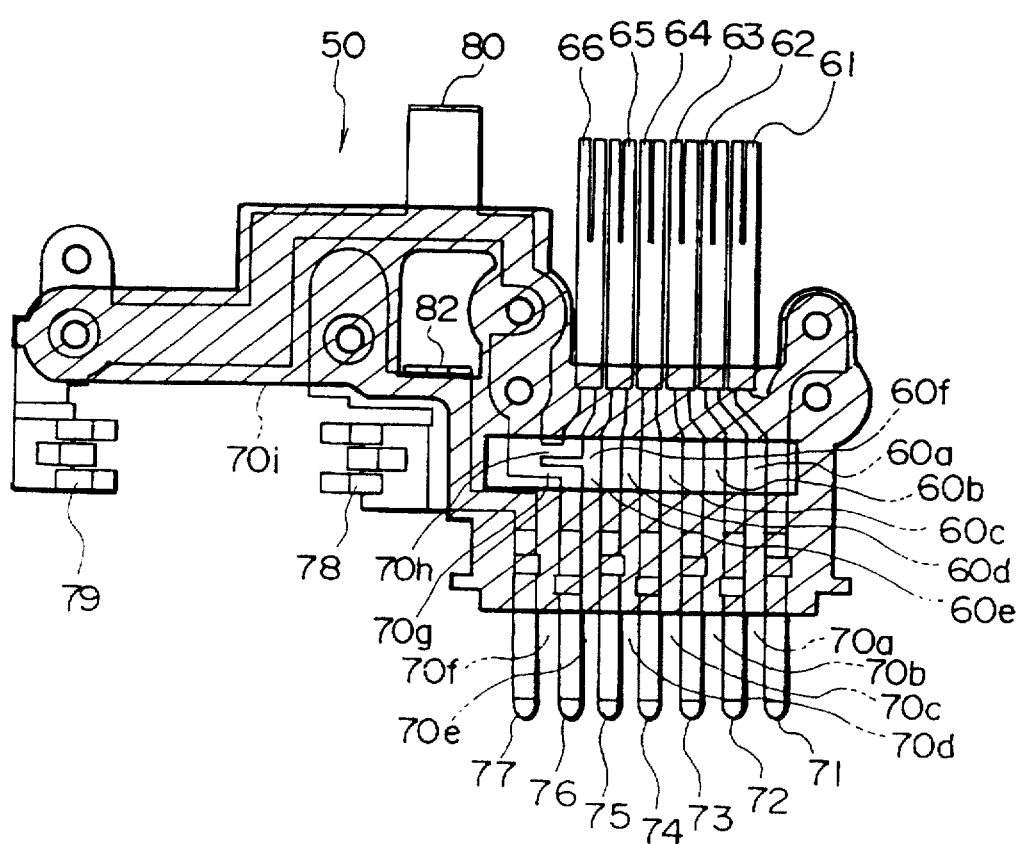
FIG. 9 shows a conducting unit that forms part of the circuit of FIG. 7B, after link portions have been cut at certain locations.

More specifically, a circuit is formed by cutting a predetermined one of the link portions 60a to 60f and 70a to 70i of the conducting unit 50. FIG. 9 shows the conducting unit 50 that forms part of the circuit shown in FIG. 7B, after some link portions have been cut at certain locations.

In FIG. 9, all of the link portions except 70g and 70h are cut. The resultant conducting state is as described below, based on FIG. 9 and with reference to FIG. 7B. The brush 61 (contact point 211) is connected by the connector pin 71 to the switch contact point 221, the brush 62 (contact point 212) is connected by the connector pin 72 to the switch contact point 222, the brush 63 (contact point 213) is connected by the connector pin 73 to the switch contact point 223, the brush 64 (contact point 214) is connected by the connector pin 74 to the switch contact point 224, and the brush 65 (contact point 215) is connected by the connector pin 75 to the switch contact point 225.

The brushes 61 to 66 are electrically disconnected from each other by cutting the link portions therebetween. The brush 66 (contact point 216) is connected by the power supply terminal 79 to the terminal 28b of the motor 20, which is not shown in this drawing (see FIG. 1).

The other terminal 28a of the motor 20 (see FIG. 1) is connected to the power supply (not shown in the drawing) by the power supply terminal 78 and the connector pin 77. Note that the power supply terminals 78 and 79 are electrically disconnected from each other by cutting the link portion 70g and the connector pins 76 and 77 are electrically disconnected from each other by cutting the link portion 70i.

The operation of the motor actuator 2 is now described, based on FIG. 7B. In the state shown in this drawing, the switch contact point 222 is grounded by the switch 220, but since the contact point 212 is on the insulating portion 202 and the contact points 212 and 216 are electrically isolated, no current flows and the motor 20 does not rotate.

If the switch 220 is switched so as to ground the switch contact point 221, the conductive portion 44a completes a circuit between the contact points 211 and 216 and the motor 20 rotates. When the contact point 211 reaches the insulating portion 201, the circuit is broken by the insulating portion 201 and the motor 20 stops rotating.

Similarly, if the switch 220 is switched so as to ground the switch contact point 223, the conductive portion 44a completes the circuit between the contact points 213 and 216 and the motor 20 rotates. When the contact point 213 reaches the insulating portion 203, the circuit is broken by the insulating portion 203 and the motor 20 stops rotating. If the switch 220 is switched so as to ground the switch contact point 224, the conductive portion 44a completes the circuit between the contact points 214 and 216 and the motor rotates. When the contact point 214 reaches the insulating portion 204, the circuit is broken by the insulating portion 204 and the motor stops rotating. Similarly, if the switch 220 is switched so as to ground the switch contact point 225, the conductive portion 44a completes the circuit between the contact points 215 and 216 and the motor 20 rotates. When the contact point 215 reaches the insulating portion 205, the circuit is broken by the insulating portion 205 and the motor 20 stops rotating.

In this way, switching the switch 220 makes it possible to stop the motor 20 in any of five positions: with the contact point 211 on the insulating portion 201, with the contact point 212 on the insulating portion 202, with the contact point 213 on the insulating portion 203, with the contact point 214 on the insulating portion 204, or with the contact point 215 on the insulating portion 205.

In this way, by stopping the motor actuator 2 shown in FIG. 6 selectively at any of five positions by means of a link mechanism, not shown in the drawings, it is possible to drive the dampers 94 and 96 to open or close the ducts 94a, 94b, 96a, and 96b.

The following description relates to the motor actuator 3.

In FIG. 7C, the pattern of the pattern board 46 comprises a ring-shaped conductive portion 301 in the vicinity of the outer periphery of the pattern board 46 and a smaller-diameter, concentric conductive portion 303 which are electrically connected to the conductive portion 301 by a circular-arc resistive portion 302. In more detail, this resistive portion 302 is provided between a projection 301a projecting inward from the ring-shaped conductive portion 301 and a projection 303a projecting outward from the conductive portion 303, and is connected thereto. In comparison with the conductive portions 301 and 303, the resistive portion 302 has a higher resistance and thus acts as a resistor. The resistive portion 302 is formed in a circular arc shape with the ends thereof being connected to the projections 301a and 303a.

The brushes 61 to 66 (see FIGS. 2A to 2C) slide over and contact the conductive portions 301 and 303 or the resistive portion 302 at contact positions shown in FIG. 7C as contact points 311 to 316. The brushes and contact points are related as follows: the brush 61 to the contact point 311, the brush 62 to the contact point 312, and so on up to the brush 66 to the contact point 316.

The contact points 311 and 312 slide along a circular path in contact with the conductive portion 301. The contact points 313 and 314 slide along a circular path that includes the resistive portion 302, and the contact points 315 and 316 slide along the conductive portion 303.

Since the resistive portion 302 is arc-shaped and is connected to the ring-shaped conductive portions 301 and 303 by the ends thereof, the resistance between the contact points 311 and 312 and the contact points 313 and 314 is smaller the closer the contact points 313, 314 are to the projection 301a, but increases as the contact points 313 and 314 move closer to the projection 303a.

The contact points 311 and 312 are connected together to a terminal 321 of a control unit 320, the contact points 313 and 314 are connected together to a terminal 322 of the control unit 320, and the contact points 315 and 316 are connected together to a terminal 323 of the control unit 320.

The control unit 320 applies a fixed voltage across the terminals 321 and 323, and also detects and stores such a voltage. From the detected voltage, it is possible to determine the rotational position of the output gear 36 (see FIG. 1) on which the pattern board 46 is mounted, and thus determine the rotational position of the shaft 38.

As described above, since the resistance between the contact points 313 and 314 and the contact points 311 and 312 varies relative to the position of the contact points 313 and 314, the voltage across these contact points also varies. In other words, the combination of the pattern board 46 and the brushes 61 to 66 form a voltage dividing circuit. Conversely, it is possible to detect the rotational position of the shaft 38 from the above-described voltage. Moreover, the degree of opening of the damper 98 (see FIG. 6) can be determined from the detected rotational position of the shaft 38.

Thus the control unit 320 determines the degree of opening of the damper 98 according to the temperature in the controller 90 (see FIG. 6), the corresponding rotational position of the shaft 38, and the corresponding position of the contact points 313 and 314, then computes the corresponding electrical potential difference between the contact points 311 and 312 and the contact points 313 and 314.

The control unit 320 applies a given voltage across terminals 324 and 325 to drive the motor 20 to rotate the pattern board 46 in the direction in which the above electrical potential difference is detected. When the electrical potential difference between the contact points 311 and 312 and the contact points 313 and 314 is the same as a voltage that has been set according to the degree of opening of the damper 98, the power supply is stopped to stop the motor 20. In this way the damper 98 is operated.

Figure 10:
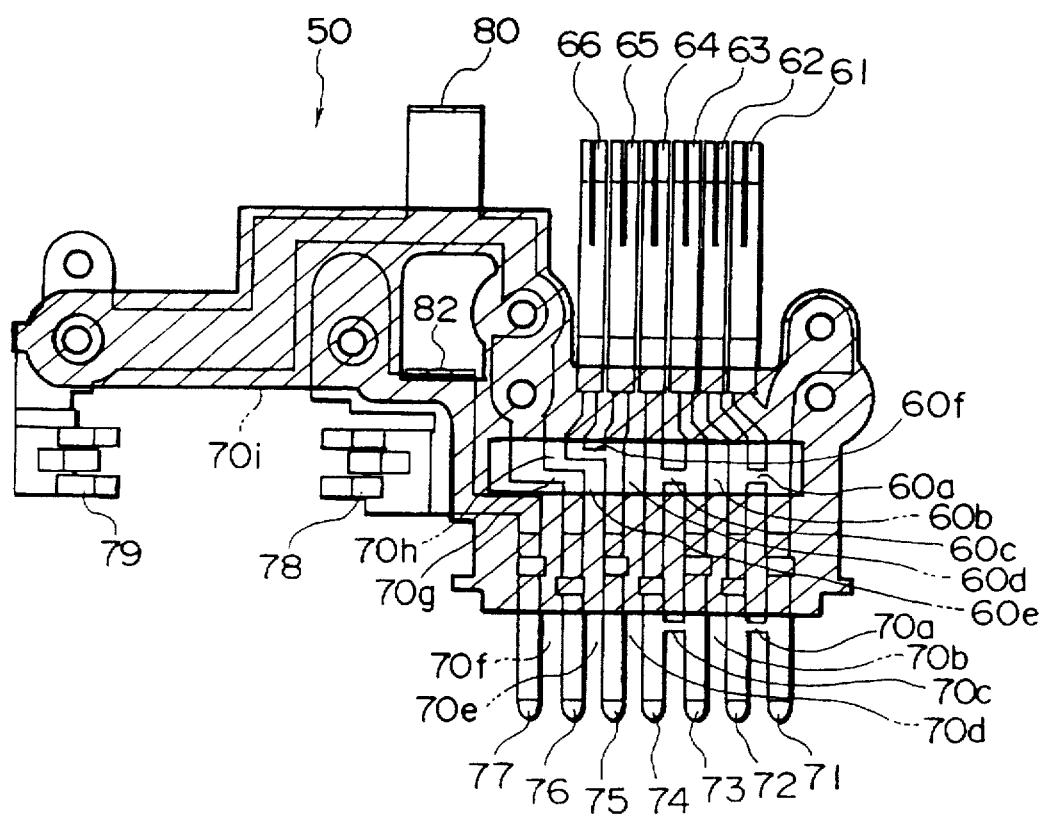
FIG. 10 shows a conducting unit that forms part of the circuit of FIG. 7C, after link portions have been cut at certain locations.

More specifically, this circuit is formed by cutting certain parts of the link portions 60a to 60f and 70a to 70i of the conducting unit 50. FIG. 10 shows the conducting unit 50 that forms part of the circuit in FIG. 7C, after the link portions have been cut at certain locations.

In FIG. 10, the link portions 60b, 60d, 60e, 70b, 70d, 70e, 70f, 70h, and 70i have been cut. The resultant conducting state is as described below.

Firstly, the brushes 61 and 62 (contact points 311 and 312) are connected together by the link portions 60a and 70a, and are also connected by the connector pins 71 and 72 to the terminal 321 (see FIG. 7C).

The brushes 63 and 64 (contact points 313 and 314) are connected together by the link portions 60c and 70c, and are also connected by the connector pins 73 and 74 to the terminal 322 (see FIG. 7C). Note that the brushes 62 and 63 are electrically disconnected from each other by cutting the link portions 60b and 70b.

Similarly, the brushes 65 and 66 (contact points 315 and 316) are connected together by the link portion 60f and are connected to the terminal 323 (see FIG. 7C). Note that the brushes 64 and 65 are electrically disconnected from each other by cutting the link portions 60d and 70d.

The power supply terminal 78 and the connector pin 77 are connected together electrically and the power supply terminal 79 and the connector pin 76 are also connected together electrically, but the power supply terminals are electrically disconnected from each other by cutting the link portions 70f and 70i. Similarly, the connector pins 75 and 76 are electrically disconnected from each other by cutting the link portion 60e.

Thus the terminal 28b of the motor 20 (not shown in the drawing) is connected by the power supply terminal 79 through the connector pin 76 to one of the terminals 324 and 325, and the terminal 28a of the motor 20 is connected to the power supply terminal 78 through the connector pin 77 to the other of the terminals 324 and 325.

A variation of the position detection mechanism provided by the motor actuator of this embodiment will now be described.

Figure 11:
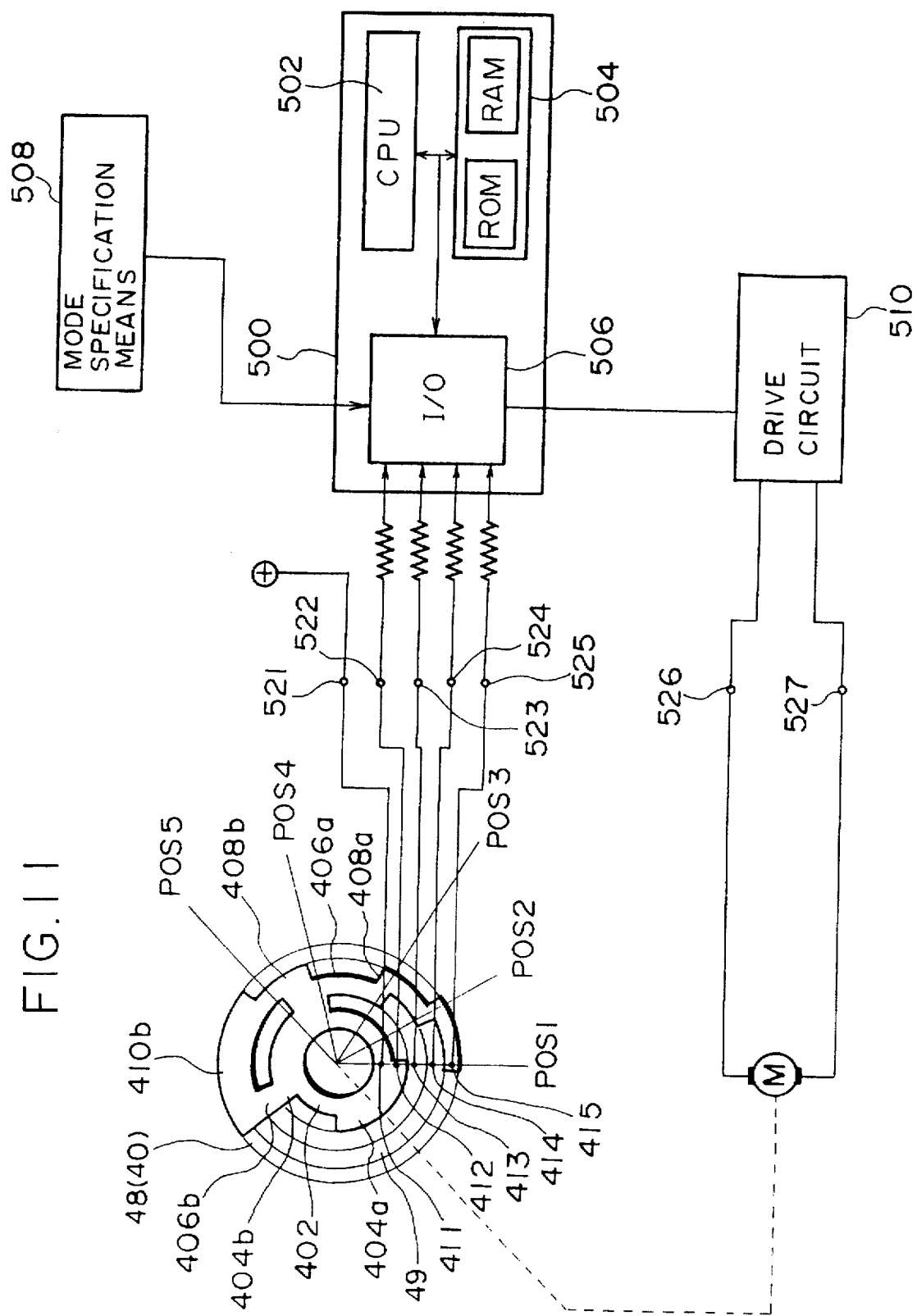
FIG. 11 shows another variation of a circuit for driving the motor actuators of FIG. 6.

A circuit for driving the motor actuator 3 of FIG. 6 is shown in FIG. 11. A pattern board 48 embodies a specific pattern of the pattern board 40 of FIG. 1.

The pattern board 48 comprises a common conductive portion 402 and a plurality of individual conductive portions, and it is also provided with an encoder pattern 49 for outputting signals relating to the detected position of the damper 98.

The common conductive portion 402 is provided in a ring shape in the vicinity of an inner peripheral edge of the encoder pattern 49 shown in FIG. 11. Individual conductive portions 404a and 404b are concentric with the common conductive portion 402 but have larger diameters and are disposed around the periphery thereof. Similarly, individual conductive portions 406a and 406b are disposed on the outer side of the portions 404a and 404b, individual conductive portions 408a and 408b are disposed on the outer side of the portions 406a and 406b, and individual conductive portions 410a and 410b are disposed on the outer side of the portions 408a and 408b. The common conductive portion 402 and the plurality of individual conductive portions 404a to 410b are formed as an integral body, with at least part of circular arc portions on the inner or outer sides thereof being in contact with other portions thereof, as shown in FIG. 11.

The brushes 61 to 65 (see FIGS. 2A to 2C) slide along the common conductive portion 402 and the individual conductive portions 404a to 410b, with the contact points therebetween denoted by 411 to 415. Note that the brush 66 is not used in this circuit. The brushes and contact points are related as follows: the brush 61 to the contact point 411, the brush 62 to the contact point 412, and so on up to the brush 65 to the contact point 415.

The contact point 411 slides along a circular path provided by the common conductive portion 402. In other words, the common conductive portion 402 is always in contact with the brush 61 so that it is connected via a terminal 521 to a positive potential, that is, a high level.

The contact point 412 slides along a circular path comprising the individual conductive portions 404a and 404b, the contact point 413 slides along a circular path comprising the individual conductive portions 406a and 406b, the contact point 414 slides along a circular path comprising the individual conductive portions 408a and 408b, and the contact point 415 slides along a circular path comprising the individual conductive portions 410a and 410b.

Each of the individual conductive portions 404a to 410b comes into contact with the corresponding contact points 412 to 415 at positions POS.1 to POS.5. At that time, the level of each of the contact points goes high.

In this embodiment of the invention, control over position detection is provided by a microprocessor 500. This microprocessor 500 comprises a central processing unit (CPU) 502, memory 504 configured of ROM and RAM, and an input-output interface 506. Input terminals 522 to 525 of the input-output interface 506 are connected to the contact points 412 to 415, respectively.

A mode specification 508 is connected to the input-output interface 506. An output side of the input-output interface 506 is connected to a drive circuit 510 of the motor 20. The drive circuit 510 receives command signals that instruct forward rotation, reverse rotation, or stop, and the drive circuit 510 causes the motor 20 to rotate forward or backward or to stop accordingly.

The operation of the thus configured position detection mechanism will now be described.

First of all, when a predetermined mode is input to the mode specification means 508, a corresponding signal is read from a look up table stored in the ROM part of the memory 504 of the microprocessor 500. Note that table shown in FIG. 12 is stored in ROM.

The current position is stored in RAM, and a signal indicating that position is read therefrom. The CPU 502 compares the predetermined mode signal read from ROM with the current position signal read from RAM. The CPU 502 outputs a command signal to the drive circuit 510 for either positive rotation or reverse rotation, according to the result of this comparison.

The drive circuit 510 supplies current in accordance with this command signal to drive the motor 20.

The rotation of the motor 20 rotates the output gear 36 of FIG. 1, this rotates the pattern board 48, and thus the positions of the contact points 411 to 415 are changed with respect to the encoder pattern 49. The positions of the contact points 411 to 415 are detected by the microprocessor 500 in accordance with input signals from the encoder pattern 49. In other words, input signals from the input terminals 522 to 525 connected to the contact points 411 to 415 are detected to be either high (binary 1) or low (binary 0).

The motor 20 is stopped when the comparison of the signal indicating the positions of the contact points 411 to 415 and the commanded predetermined mode signal indicates a match. A signal indicating the new current position is stored in the RAM of the memory 504. Thus the damper 98 is driven and the minimum amount of data necessary for detecting eleven positions specified by the predetermined mode is four bits.

The circuit therefor is formed specifically by cutting the link portions 60a to 60f and 70a to 70i at certain locations. A variation of the conducting unit 50 that forms part of the circuit of FIG. 11 in which the link portions are cut at certain locations is shown in FIG. 13.

Figure 13:
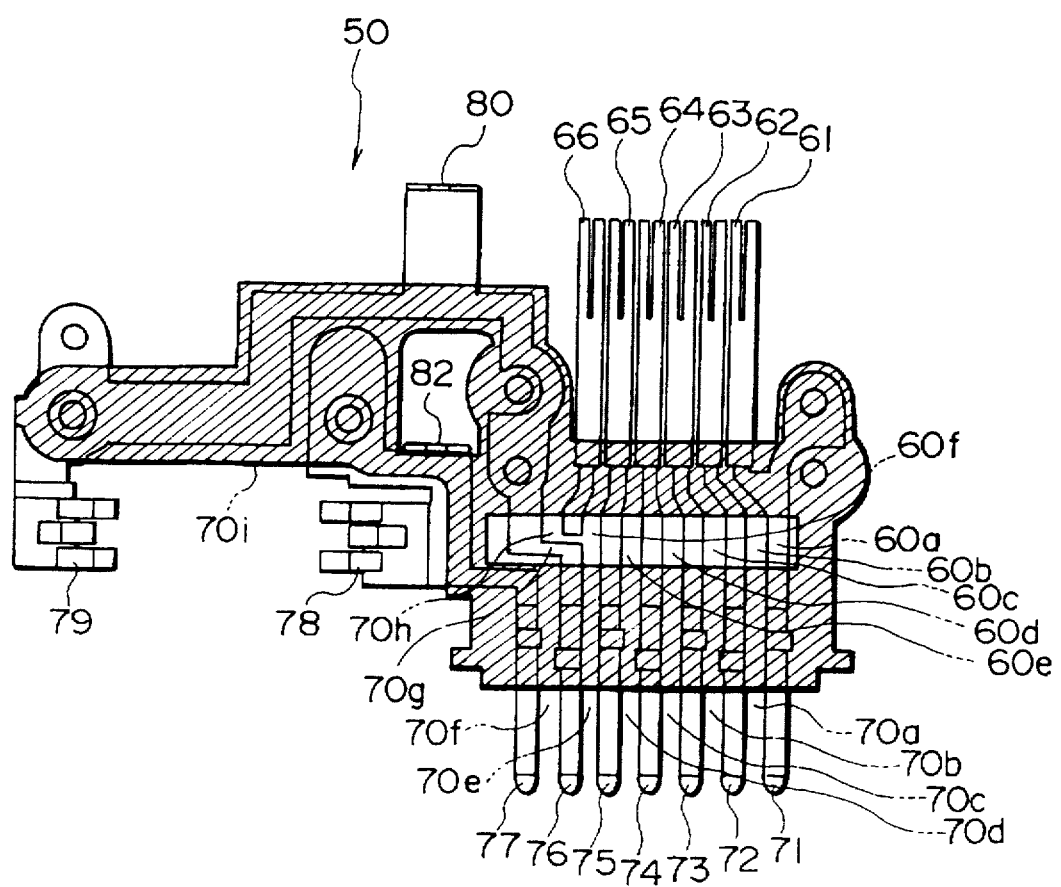
FIG. 13 shows a conducting unit that forms part of the circuit of FIG. 11, after link portions have been cut at certain locations.

In FIG. 13, all of the link portions except 70g are cut. If the conducting state is described based on FIG. 13 with reference to FIG. 11, the brush 61 (contact point 411) is connected by the connector pin 71 to the terminal 521. Similarly, the brush 62 (contact point 412) is connected by the connector pin 72 to the input terminal 522, the brush 63 (contact point 413) is connected by the connector pin 73 to the input terminal 523, the brush 64 (contact point 414) is connected by the connector pin 74 to the input terminal 524, and the brush 65 (contact point 415) is connected by the connector pin 75 to the input terminal 525. The brushes 61 to 65 are electrically disconnected from each other by cutting the link portions therebetween. The brush 66 is not used in this circuit so it is completely disconnected by cutting the link portions 60f and 70h.

The connector pin 76 is connected to a terminal 526, the connector pin 77 is connected to a terminal 527, and the power supply terminals 78 and 79 are connected to the motor 20. Note that the power supply terminals 78 and 79 are electrically disconnected from each other by cutting the link portion 70i and the connector pins 76 and 77 are electrically disconnected from each other by cutting the link portion 70f.

In this manner, the embodiment shown in FIGS. 11 to 13 makes it possible to fabricate an extremely simple position control mechanism using four-bit signals, by the preparation of the encoder pattern 49 on the pattern board 48 for position detection and selective cutting of the link portions 60a to 60f and 70a to 70i of the conducting unit 50, to provide an inexpensive motor actuator. The individual conductive portions that form the encoder pattern 49 slide backwards and forwards relative to the brushes 61 to 66 but, since this individual conductive portions have an integral configuration, it has a simple and sturdy structure, enabling reliable positional control.

Figure 14A:
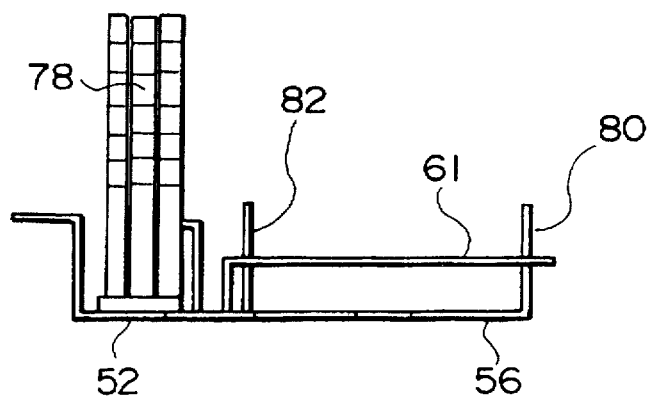
FIGS. 14A to 14C show an example of making process of the conducting unit of FIG. 1.
Figure 14B:
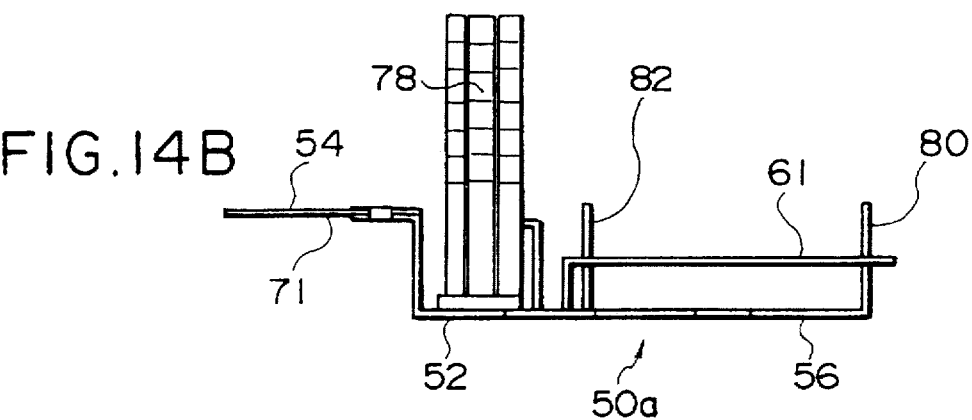
Figure 14C:
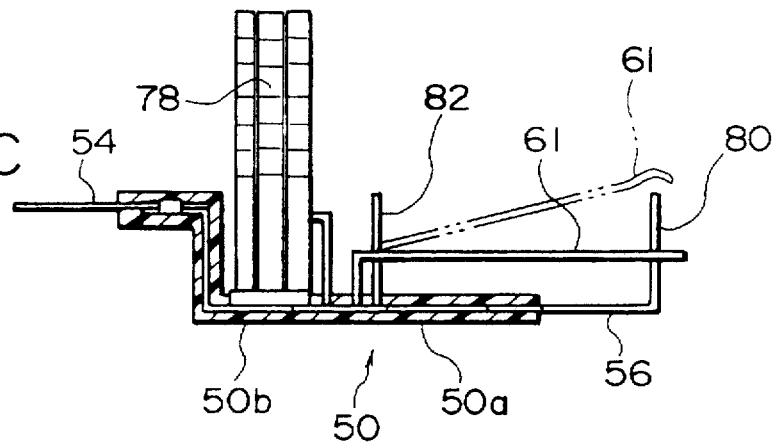

FIGS. 14A to 14C show an example of making process of the conducting unit 50 of FIG. 1. First of all, as shown in FIG. 14A, the first conductive plate 52 is manufactured from a conductive sheet. More specifically, the conductive sheet is punched by press metal molds and simultaneously the connection terminals 80 and 82, and the power supply terminals 78 and the like are configured to be bent. The brushes 61 to 66 (see FIG. 3) are formed to stand upright and to be bent rectangularly in a temporary shape which is different from the final shape shown in FIG. 1. The second conductive plate 54 is manufactured from a conductive sheet by press metal molds. Both of the first and second conductive plate 52 and 54 can be manufactured at the same time.

Subsequently, as shown in FIG. 14B, the conductive plate 50a is obtained by linking the first and second conductive plate 52 and 54. FIGS. 4A to 4C show how to link them.

Then, as shown in FIG. 14C, the support portion 50b formed of an insulating resin connects predetermined portions of the conductive plate 50a. Some of the link portions 60a to 60f and 70a to 70i (see FIG. 2) of the conductive plate 50 are cut by punching. Simultaneously, brushes 61 to 66 are finally adjusted to be bent. Thus, the conducting unit 50 can be obtained.

With this making process, since the shapes of the brushes 61 to 66 are finally adjusted, the deformation of brushes 61 to 66 is prevented during the making process. The predetermined height of the brushes 61 to 66 and the predetermined contact pressure to the pattern board 40 (see FIG. 1) can be obtained.

Figure 15:
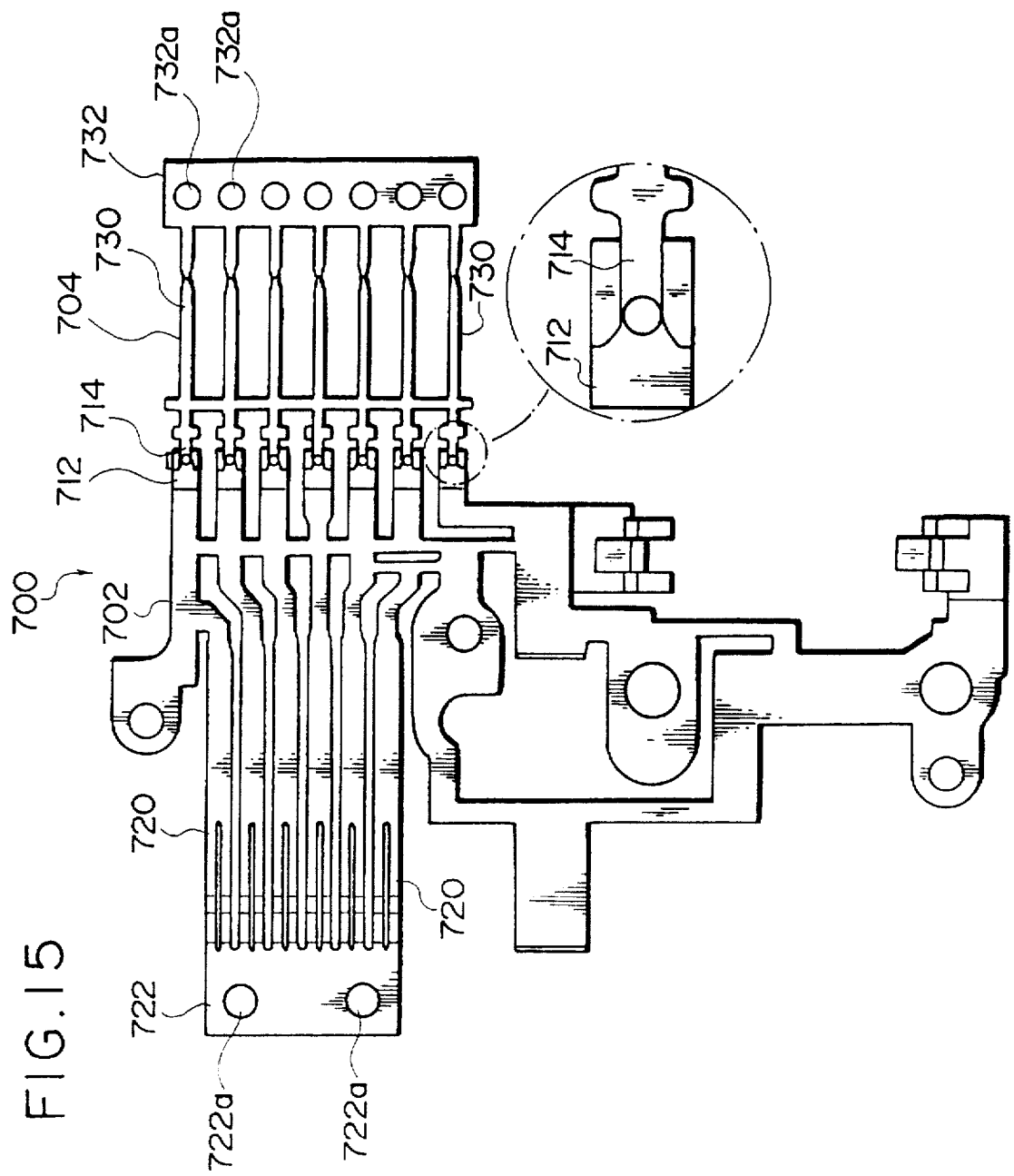
FIG. 15 shows another embodiment of a conductive plate in the middle of its making process.

FIG. 15 shows another embodiment of a conductive plate in the middle of its making process. The conductive plate 700 is formed of a first conductive plate 702 and a second conductive plate 704 that are separate components connected together. A linking portion between a link portion 712 of the first conductive plate 702 and a link portion 714 of the second conductive plate 704 is shown enlarged in the FIG. 15.

Figure 16A:
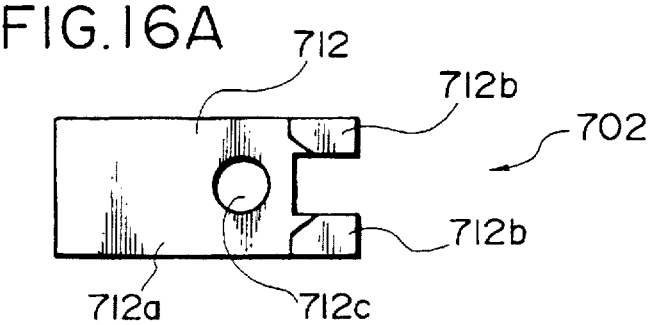
FIGS. 16A to 16C are a plan view, a side view and a front view of a link portion of the first conductive plate.
Figure 16B:
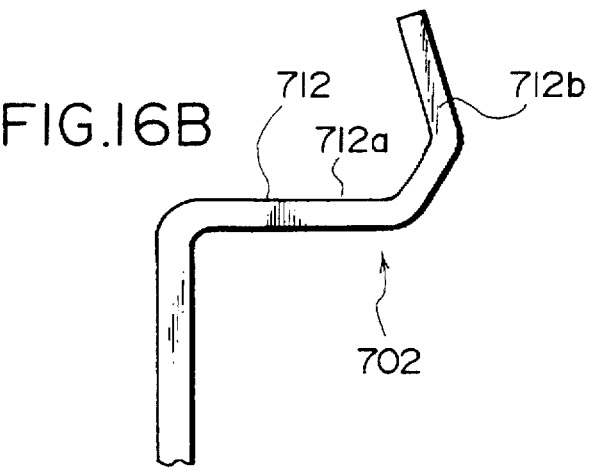
Figure 16C:
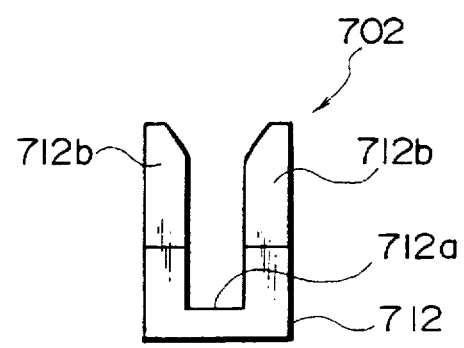
Figure 17A:
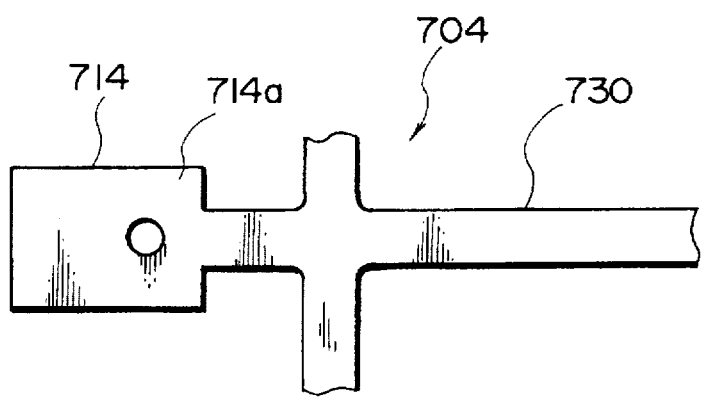
FIGS. 17A and 17B are a plan view and a side view of a link portion of the second concuctive plate.
Figure 17B:
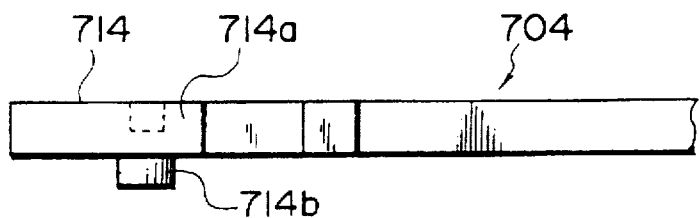

FIGS. 16A to 16C are a plan view, a side view and a front view of the link portion 712 of the first conductive plate 702. FIGS. 17A and 17B are a plan view and a side view of a link portion of the second conductive plate.

The link portion 712 of the first conductive plate 702 comprises a fixing portion 712a that forms a engaging aperture 712c thereon. A pair of nail portions 712b are formed from the edge of the fixing portion 712a. The nail portions 712b are formed to stand upright from the fixing portion 712a and are slightly bent to be easily folded.

The first conductive plate 702 shown in FIG. 15 has a plurality of brushes 720 like the conductive plate 52 shown in FIG. 2. The brushes 720 are connected to each other by a temporary connection portion 722 that forms guide apertures 722a thereon. The guide apertures 722a are cut after used for positioning during the making process. Other components and other making processes of the first conductive plate 702 are the same as those of the first conductive plate 52 in FIG. 2.

The link portion 714 has a supported portion 714a that forms a projection 714b thereon. The projection 714b engages with the engaging aperture 712c. The second conductive plate 704 shown in FIG. 15 has a plurality of connector pins 730 like the conductive plate 54 shown in FIG. 2. Each of the connector pins 730 is formed projecting from the supported portion 714a. The connector pin 730 has a width to be positioned between a pair of nail portions 712b that is formed on the link portion 712 of the first conductive plate 702. On the other hand, the supported portion 714a has a broader width than a gap between the pair of nail portions 712b. Accordingly, the supported portion 714a engages with the nail portions 712b.

The connector pins 730 are connected to each other by a temporary connection portion 732 that forms guide apertures 732a thereon. The guide apertures 732a are cut after used for positioning during the making process. Other components and other making processes of the second conductive plate 704 are the same as those of the second conductive plate 54 in FIG. 2.

Figure 18A:
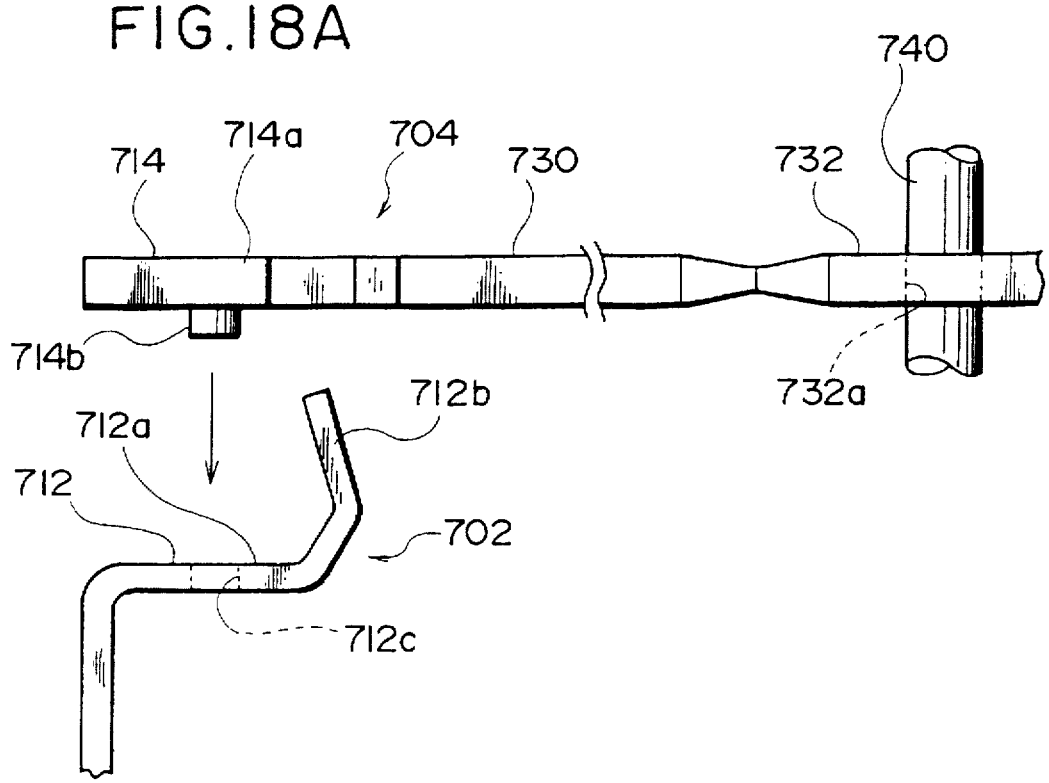
FIGS. 18A and 18B show a process of linking the first and second conductive plate.
Figure 18B:
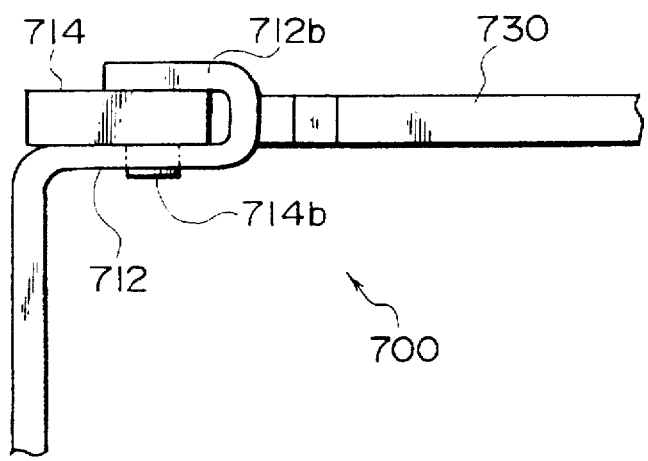

FIGS. 18A and 18B show a process of linking the first and second conductive plate 702 and 704.

First of all, the first conductive plate 702 is positioned with a jig (not shown in the figure) penetrating the guide apertures 722a (see FIG. 15). Then, as shown in FIG. 18A, the second conductive plate 704 is positioned with a jig 740 penetrating the guide apertures 732a. Specifically, the second conductive plate 704 is positioned such that the projection 714b of the second conductive plate 704 is positioned above the engaging aperture 712c of the first conductive plate 702. Then the projection 714b is put into the engaging aperture 712c.

Subsequently, the nail portions 712b of the first conductive plate 702 are staked and electrically heat-caulked such that the nail portions 712b are folded and the supported portion 714a is held by the fixing portion 712a and the nail portions 712b to connect the link portions 712 and 714. Since the nail portions 712b are declined in the direction of being folded, those are staked through the upward and downward motion of metal molds (not shown in the figure). The nail portions 712b are folded along the extension of the connector pins. The connector pins 730 are precisely positioned preventing them from moving across the their extending direction.

Thus, the first and second conductive plate 702 and 704 are connected and the conductive plate 700 can be obtained. Then the temporary connection portion 722 and 732 are cut. The angle of brushed 720 is adjusted after some electrical link portions are cut like the conductive plate 50a in FIG. 2.

The making process of this embodiment is suitable for automation since the second conductive plate 704 is attached toward the first conductive plate 702 with vertical movement.

Note that the invention is not limited to the embodiments described above, and thus it can be modified in various ways. For example, the motor actuator of this invention is not limited to controlling the air-conditioning of a vehicle. It can provide positional control in a variety of devices. Similarly, the pattern board is not only fixed to an output gear but also fixed to one surface of a reduction gear, for example.

What is claimed is:

1. A motor actuator comprising:

a gear rotated by a motor;

a pattern conductor provided on one surface of said gear and rotating together with said gear; and a conducting unit, said conducting unit comprising a first conductive plate and a second conductive plate molded into an integral unit by an insulating resin, said first conductive plate comprising a plurality of brushes sliding over said pattern conductor and a first pattern portion, said first pattern portion forming a first predetermined wiring pattern, said first pattern portion comprising a plurality of first link portions, said first predetermined wiring pattern being formed to suit the drive of said motor, said second conductive plate comprising a plurality of external connection terminals for connections with other components and a second pattern portion, said second pattern portion forming a second predetermined wiring pattern, said second pattern portion comprising a plurality of second link portions, said second predetermined wiring pattern being formed to suit the drive of said motor, said conducting unit comprising a pair of power supply terminals, said power supply terminals being parts of said first and second conductive plates.

2. The motor actuator of claim 1, wherein said second conductive plate is formed to be thicker than said first conductive plate.

3. The motor actuator of claim 1, wherein said pattern conductor further comprises:

a conductive portion being concentric with a shaft of said gear;

a first interruptive portion, said first interruptive portion being formed within part of said conductive portion in a circular arc along a first circular path, said first circular path being concentric with said shaft of said gear, said first interruptive portion interrupting a circuit through said conductive portion; and a second interruptive portion, said second interruptive portion being formed within part of said conductive portion in a circular arc along a second circular path, said second circular path being concentric with said shaft of said gear, said second interruptive portion being located at a predetermined angular displacement from said first interruptive portion; and said plurality of brushes further comprise:

a normally conductive terminal always sliding along said conductive portion, said normally conductive terminal avoiding said first and second interruptive portions;

a first intermittently conductive terminal sliding along said first circular path in which said first interruptive portion is formed; and a second intermittently conductive terminal sliding along said second circular path in which said second interruptive portion is formed.

4. The motor actuator of claim 2, wherein said pattern conductor further comprises:

a conductive portion being concentric with a shaft of said gear;

a first interruptive portion, said first interruptive portion being formed within part of said conductive portion in a circular arc along a first circular path, said first circular path being concentric with said shaft of said gear, said first interruptive portion interrupting a circuit through said conductive portion; and a second interruptive portion, said second interruptive portion being formed within part of said conductive portion in a circular arc along a second circular path, said second circular path being concentric with said shaft of said gear, said second interruptive portion being located at a predetermined angular displacement from said first interruptive portion; and said plurality of brushes further comprise:

a normally conductive terminal always sliding along said conductive portion, said normally conductive terminal avoiding said first and second interruptive portions;

a first intermittently conductive terminal sliding along said first circular path in which said first interruptive portion is formed; and a second intermittently conductive terminal sliding along said second circular path in which said second interruptive portion is formed.

5. The motor actuator of claim 1, wherein said pattern conductor further comprises:

a resistive portion having a predetermined resistance, said resistive portion being formed on a circular arc being concentric with a shaft of said gear; and a conductive portion, said conductive portion being formed on a circular path that is concentric with said shaft of said gear, said conductive portion being electrically connected to one edge of said circular arc of said resistive portion in a longitudinal direction thereof; and said plurality of brushes comprises:

a conductive conductor terminal, said conductive conductor terminal making contact with said conductive portion; and a resistive conductor terminal, said resistive conductor terminal making contact with said resistive portion.

6. The motor actuator of claim 2, wherein said pattern conductor further comprises:

a resistive portion having a predetermined resistance, said resistive portion being formed on a circular arc being concentric with a shaft of said gear; and a conductive portion, said conductive portion being formed on a circular path that is concentric with said shaft of said gear, said conductive portion being electrically connected to one edge of said circular arc of said resistive portion in a longitudinal direction thereof; and said plurality of brushes comprises:

a conductive conductor terminal, said conductive conductor terminal making contact with said conductive portion; and a resistive conductor terminal, said resistive conductor terminal making contact with said resistive portion.

7. The motor actuator of claim 1, wherein said pattern conductor further comprises:

a common conductive portion, said common conductive portion being formed along a circular path that is concentric with a shaft of said gear; and a plurality of individual conductive portions, said individual conductive portions being disposed in a plurality of arrays around said common conductive portion, said individual conductive portions being concentric with each other, each of said individual conductive portions being disposed at a certain spacing, said common conductive portion and said individual conductive portions being formed as an integral assembly connected together by at least portions thereof on inner or outer sides; and said plurality of brushes comprise:

a common brush sliding along said circular path formed by said common conductive portion, said common brush being always in contact with said common conductive portion; and a plurality of individual brushes, each of said individual brushes sliding along one of circular paths formed by said individual conductive portions, said individual brushes being in contact with corresponding individual conductive portions.

8. The motor actuator of claim 2, wherein said pattern conductor further comprises:

a common conductive portion, said common conductive portion being formed along a circular path that is concentric with a shaft of said gear; and a plurality of individual conductive portions, said individual conductive portions being disposed in a plurality of arrays around said common conductive portion, said individual conductive portions being concentric with each other, each of said individual conductive portions being disposed at a certain spacing, said common conductive portion and said individual conductive portions being formed as an integral assembly connected together by at least portions thereof on inner or outer sides; and said plurality of brushes comprise:

a common brush sliding along said circular path formed by said common conductive portion, said common brush being always in contact with said common conductive portion; and a plurality of individual brushes, each of said individual brushes sliding along one of circular paths formed by said individual conductive portions, said individual brushes being in contact with corresponding individual conductive portions.

9. The motor actuator of claim 1, wherein an output shaft outwardly transferring a driving force of said motor is connected to a damper within an air-conditioner of a vehicle and is attached thereto in such a manner that said output shaft switches an orientation of said damper, said damper being at least one of a damper for switching between an interior and exterior of said vehicle, a damper for switching outlet ports, and a damper for adjusting a proportion of cold and hot air.

10. The motor actuator of claim 2, wherein an output shaft outwardly transferring a driving force of said motor is connected to a damper within an air-conditioner of a vehicle and is attached thereto in such a manner that said output shaft switches an orientation of said damper, said damper being at least one of a damper for switching between an interior and exterior of said vehicle, a damper for switching outlet ports, and a damper for adjusting a proportion of cold and hot air.

11. The motor actuator of claim 1, wherein one of said first and second link portions has a plurality of nail portions, said nail portions being folded along extension of said external connection terminals of said second conductive plate, and the other of said first and second link portions has a plurality of supported portions, said supported portions being held by said folded nail portions.

12. The motor actuator of claim 11, wherein said first and second link portions form thereon apertures and projections, said apertures and projections engaging each other for positioning.

* * * * *